(12) United States Patent
Johansen et al.

(10) Patent No.: US 7,701,574 B2
(45) Date of Patent: *Apr. 20, 2010

(54) OPTICALLY CONTROLLED DETECTION DEVICE

(75) Inventors: Ib-Rune Johansen, Oslo (NO); Odd Løvhaugen, Oslo (NO)

(73) Assignee: Tomra Systems ASA (NO)

( * ) Notice: Subject to any disclaimer, the term of this patent is extended or adjusted under 35 U.S.C. 154(b) by 450 days.

This patent is subject to a terminal disclaimer.

(21) Appl. No.: 11/623,808

(22) Filed: Jan. 17, 2007

(65) Prior Publication Data

US 2007/0171416 A1    Jul. 26, 2007

Related U.S. Application Data

(63) Continuation of application No. 10/432,454, filed as application No. PCT/NO01/00476 on Nov. 30, 2001, now Pat. No. 7,196,791.

(30) Foreign Application Priority Data

Nov. 30, 2000   (NO)   .................................. 20006084

(51) Int. Cl.
  *G01J 3/28*   (2006.01)
(52) U.S. Cl. ...................................... 356/328
(58) Field of Classification Search ................ 356/328; 359/558, 566
See application file for complete search history.

(56) References Cited

U.S. PATENT DOCUMENTS

| 3,015,984 | A | 1/1962 | Martin |
| 3,263,079 | A | 7/1966 | Mertz et al |
| 3,515,459 | A | 6/1970 | Wood |
| 3,523,734 | A | 8/1970 | Brehm et al. |
| 3,782,828 | A | 1/1974 | Alfano et al. |
| 3,791,737 | A | 2/1974 | Johansson |
| 4,060,327 | A | 11/1977 | Jacobowitz et al. |
| 4,087,183 | A | 5/1978 | Passereau |
| 4,191,473 | A | 3/1980 | Hansch |
| 4,391,523 | A | 7/1983 | Hildebrand et al. |
| 4,461,573 | A | 7/1984 | Lucht et al. |
| RE32,598 | E | 2/1988 | White |
| 4,729,658 | A | 3/1988 | Poultney |

(Continued)

FOREIGN PATENT DOCUMENTS

CA    2193699    3/2006

(Continued)

*Primary Examiner*—Kara E Geisel
(74) *Attorney, Agent, or Firm*—Rodman & Rodman

(57) ABSTRACT

A diffractive optical element device for use in spectroscopy, where broadband light is emitted from a light source towards the optical element and from there is transmitted to at least one detector. The optical element has a plurality of diffractive dispersively focusing patterns, preferably partly integrated into each other, whose respective centers are two-dimensionally offset relative to each other in order to produce a plurality of spectra, where at least two are separate, but offset relative to each other and/or partly overlapping. In an alternative embodiment, the optical element consists of either one diffractive optical element that is related to a wavelength and produces a spectrum, or at least two diffractive optical elements which are related to respective wavelengths and which produce at least two mutually partly overlapping spectra to give a composite spectrum. The optical element is capable of producing at least one indication of upper and/or lower wavelength value in the spectrum.

72 Claims, 22 Drawing Sheets

U.S. PATENT DOCUMENTS

| | | |
|---|---|---|
| 4,762,412 A | 8/1988 | Ohkubo et al. |
| 4,815,849 A | 3/1989 | Sullivan |
| 4,886,341 A | 12/1989 | Oishi et al. |
| 5,071,207 A | 12/1991 | Ceglio et al. |
| 5,278,629 A | 1/1994 | Schlager et al. |
| 5,369,276 A | 11/1994 | Antesberger |
| 5,377,003 A | 12/1994 | Lewis et al. |
| 5,491,344 A | 2/1996 | Kenny et al. |
| 5,526,116 A | 6/1996 | De Groot |
| 5,565,983 A | 10/1996 | Barnard |
| 5,615,673 A | 4/1997 | Berger et al. |
| 5,661,594 A | 8/1997 | Rhoads et al. |
| 5,671,050 A | 9/1997 | De Groot |
| 5,680,209 A | 10/1997 | Machler |
| 5,905,571 A | 5/1999 | Butler et al. |
| 5,973,780 A | 10/1999 | Tsuboi et al. |
| 6,100,974 A | 8/2000 | Reininger |
| 6,226,083 B1 | 5/2001 | Schwerzel et al. |
| 6,335,831 B2 | 1/2002 | Kowarz et al. |

FOREIGN PATENT DOCUMENTS

| | | |
|---|---|---|
| EP | 0 075 171 A1 | 3/1983 |
| EP | 0322654 B1 | 3/1994 |
| EP | 0750207 | 12/1996 |
| GB | 2000878 | 1/1979 |
| GB | 2 219 853 A | 12/1989 |
| JP | 57-037223 | 3/1982 |
| JP | 02-203249 A | 8/1990 |
| JP | 11-132847 A | 5/1999 |
| JP | 11230828 | 8/1999 |
| JP | 2001-330717 A | 11/2001 |
| WO | WO 96/34256 | 10/1996 |
| WO | WO9801729 A1 | 1/1998 |
| WO | WO 99/61941 | 12/1999 |
| WO | WO 00/62267 | 10/2000 |

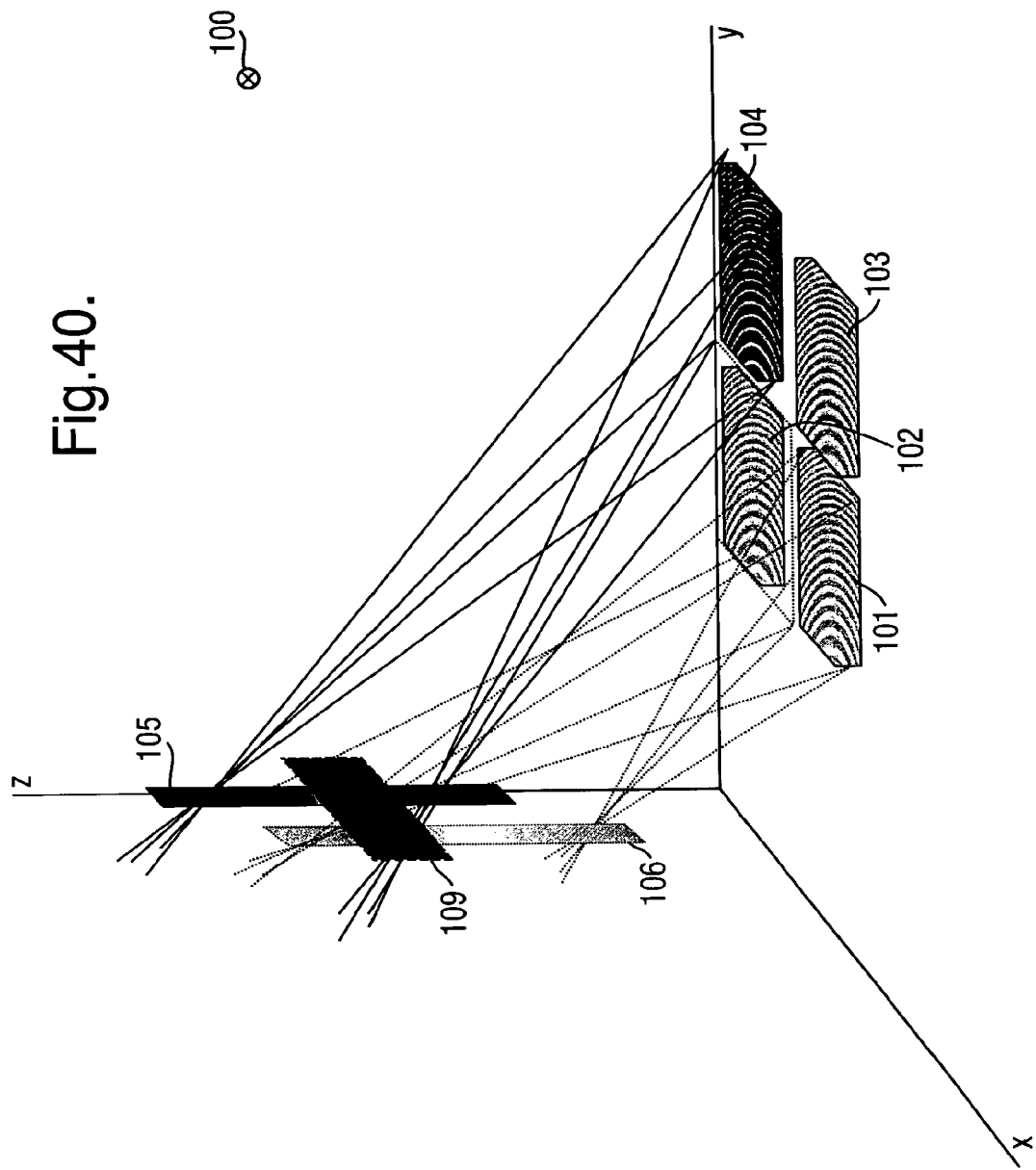

OPTICALLY CONTROLLED DETECTION DEVICE

The present invention relates to a diffractive optical element device for use in spectroscopy, where broad-band light is emitted from a light source towards the optical element and from there is transmitted to at least one detector.

As illustrations of the prior art reference is made to WO 9961941, U.S. Pat. No. 4,729,658, WO 0062267, WO 9634256, EP 0075171, GB 2219853, U.S. Pat. Nos. 5,369, 276 and 4,391,523.

WO 9961941 relates to a diffractive optical element in two layers for increasing the wavelength range for the purpose of correcting colour aberration (chromatic aberration). Thus, there is the same focus for blue and red, whereas the present invention in effect seeks instead to disperse the colours, and one of the ways in which this is achieved is by placing the patterns in the same plane.

U.S. Pat. No. 4,729,658 uses a grating as a diffractive optical element, but in this case the element does not provide a focusing solution. Focusing takes place with the aid of a lens. This known solution produces just one spectrum for each point of light, whereas the present invention provides several spectra for each point of light WO 0062267 relates to a solution which does not give any spectral resolution and no dispersive focusing either. Consequently, a plurality of spectra are not produced.

EP 0075171 describes a standard grating spectrometer with harmonic detection. This is a dispersive, non-focusing solution where the spectral response that hits the detector is modulated by a liquid crystal shutter means. The solution is not focusing and nor does it produce a plurality of spectra.

One object of the present invention is to provide a device which not only can be used for spectroscopy in connection with a medium, as for example gas or fluid, but also can be used for analysing a medium such as an article of, for example, glass or plastic, and is also suitable for use in the analysis of biological material, waste, medical samples, fluids and preparations, metals and/or alloys thereof and plastic materials or glass in general. Optionally, the said medium may consist of, for example, a cellular liquid.

One object of the present invention has been to construct diffractive optical elements for the purposes of spectroscopy. The aim has been to get a spectrum out of such a diffractive optical element, as a standard grating would do, except that the diffractive optical element can be constructed to have specific characteristics, as for example focusing effect.

Additional embodiments of respective alternatives of the device will be evident from the respective attached subordinate patent claims and the following description.

The invention will now be described in more detail with reference to the attached drawings.

FIG. 1 shows a principle of a diffractive optical element.
FIG. 2 illustrates reflectance in connection with a diffractive optical element.
FIG. 3 shows source and detector location in connection with a first embodiment.
FIG. 4 shows source and detector location relative to an optical element according to a second embodiment.
FIG. 5a shows the phase of the reflectance function before it is cut off to obtain the profile of the diffractive optical element.
FIG. 5b shows the distance along the profile.
FIG. 6a shows the profile of the diffractive optical element, and FIG. 6b shows distance along the profile.
FIG. 7 shows an outer part of a Fresnel zone plate.
FIG. 8 shows a diffractive optical element profile for a two wavelength case.
FIG. 9 shows a general two-wavelength case associated with the profile of a diffractive optical element and related to the embodiment shown in FIG. 3.
FIG. 10 illustrates the production of a spectrum based on light transmitted through a Fresnel zone plate.
FIG. 11 shows a modification of the embodiment illustrated in FIG. 10.
FIG. 12 shows a variant of the embodiment depicted in FIG. 11.
FIG. 13 shows a further development of the embodiment illustrated in FIG. 12.
FIG. 14 shows yet another variant of the embodiment depicted in FIGS. 12 and 13.
FIG. 15 shows the use of a diffractive optical element in connection with the use of reflection.
FIG. 16 shows the use of a diffractive optical element in connection with the use of light transmission through the element.
FIG. 17 shows the use of a diffractive optical element where either the element or a cooperating detector is movable.
FIG. 18 shows wavelength focus dependency of a Fresnel zone plate in connection with the part of the lens that is offset from the optical axis of the lens.
FIG. 19 shows intensity distribution for a Fresnel zone plate for different wavelengths.
FIG. 20 shows on an enlarged scale specifications for a reflective plane.
FIG. 21 shows a grating outline for use as a diffractive optical element.
FIG. 22 shows an optical element in the form of a concave grating.
FIG. 23 shows a spectrum obtained by using a so-called blazed grating.
FIG. 24 shows a diffractive optical element having moulded reflective elements (see FIG. 21).
FIG. 25 shows a diffractive optical element which is offset from the ideal optical axis of a Fresnel zone plate, and where one or two reference elements are provided around the optical axis.
FIG. 26 shows diffraction patterns from the reference element for different wavelengths of λ.
FIG. 27 shows a spectrum with references (see also FIG. 19).
FIG. 28a shows invisible spectra (IV) side by side.
FIG. 28b shows a visible and an invisible spectrum contiguous to one another.
FIG. 28c shows a visible and an invisible spectrum spaced apart.
FIG. 28d shows visible spectra spaced apart.
FIG. 28e shows invisible spectra partly overlapping each other.
FIG. 28f shows visible spectra partly overlapping each other.
FIG. 29 shows a visible and an invisible spectrum offset in relation to one another and in connection with detectors.
FIG. 30 shows the device according to the invention in connection with a transparent or translucent medium, for example, an article.
FIG. 31 shows a minor modification of a part of the device shown in FIG. 30.
FIG. 32 shows the device in an embodiment intended for detection of a medium which has light absorption, light reflection, luminescence or re-emission properties.
FIG. 33 shows a modification of the device according to the invention intended for detection of a transparent or translucent medium, where detection is based on the light absorption, light reflection, luminescence or re-emission properties of said medium.

FIG. 40 shows the production of a spectrum based on light that is transmitted towards Fresnel zone plate fragments, and is a variant of FIG. 12.

Figure 1:
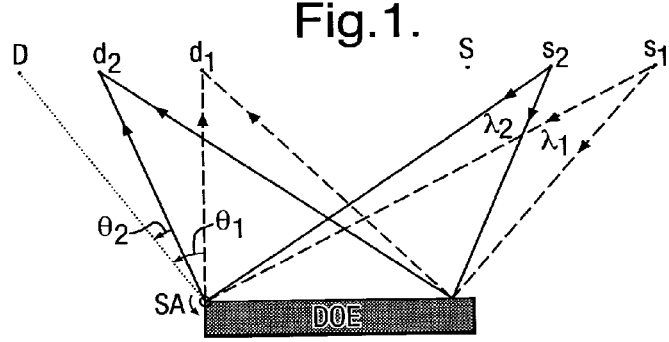
Figure 2:
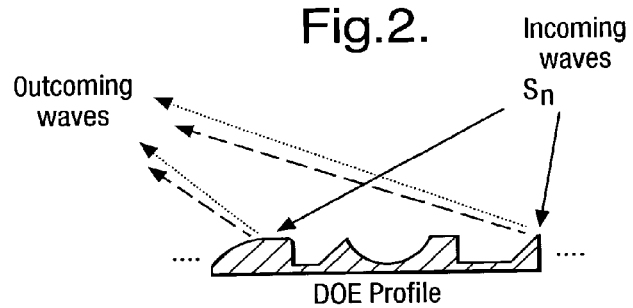

FIG. 1 shows the principle for the use of two wavelengths in connection with a diffractive optical element, hereinafter referred to as a DOE. The DOE images the point S1 onto D1 (wavelength λ1) and the point S2 onto D2 (wavelength λ2). When there is a light source S and a detector D, scanning the said DOE will have the effect of imaging $\lambda_1$, respectively $\lambda_2$, onto the detector at respective scanning angles $\theta_1$ and $\theta_2$. The problem lies in determining the profile of the said DOE having these characteristics. The scanning axis (i.e., the DOE's tilt angle) is indicated by SA. It may be useful to consider certain general aspects of the present invention. In connection with the definition of a wavefront, a source $s_n$ whose location is defined by the vector $r_{s_n,source}$ $(x_{s_n}, y_{s_n}, Z_{s_n})$ and its image $d_n$ whose location is defined by the vector $r_{d_n,detector}$ $(x_{d_n}, y_{d_n}, Z_{d_n})$ may be considered.

$S_n(r)$ is the spherical wavefront coming from the source:

$$S_n(r) = A_{s_n} \cdot e^{i \cdot k_n \cdot r_{sn}} \qquad (1)$$

with $k_n = 2\pi/\lambda_n$ and $r_{s_n} = \sqrt{x^2_{s_n} + y^2_{s_n} + z^2_{s_n}}$ and $i = \sqrt{-1}$ and where $A_{s_n}$ is the wavefront amplitude at the said DOE.

$D_n(r)$ is the spherical wavefront which is focused on the detector and defined by the equation:

$$D_n(r) = A_{d_n} \cdot e^{-i \cdot k_n \cdot r_{d_n}} \qquad (2)$$

with $r_{d_n} = \sqrt{x^2_{d_n} + y^2_{d_n} + z^2_{d_n}}$, and where $A_{d_n}$ is the wavefront amplitude at the said DOE.

It should be noted that the wavefront intensity of $S_n(r)$ is $$I_{s_n} = |S_n(r)|^2 = S_n(r) \cdot S_n(r)^* = A^2_{d_n}. \text{ And similarly,}$$
$$I_{d_n} = A_{d_n}^2. \qquad (3)$$

The DOE optical reflectance function is given by the equation $$t(r) = A_0 \cdot e^{-i \cdot k_n \cdot 2 f(r)} \qquad (4)$$

where f(r) denotes the DOE profile function, $k_n = 2\pi/\lambda_n$, and $\lambda_n$ is the wavelength of the incoming wave $S_n$.

Here, it is assumed that the phase delay caused by reflection on the said DOE is a pure geometric addition to the optical path length.

Given Fourier optics, it is possible to write:

Outcoming waves = $S_n(r) \cdot t(r)$ (5).

It may also be useful to consider more closely the theory related to a diffractive optical element. The single wavelength case can be taken as a starting point.

The source $S_1$ emits light at wavelength $\lambda_1$ and is imaged on $d_1$. Given equations 4 and 5, the following is obtained:

Outcoming wave = $D_1 = S_1 \cdot t(r) \Leftrightarrow$ $$t(r) = D_1 \cdot \frac{S_1^*}{|S_1|^2} \Leftrightarrow t(r) = \frac{A_{d_1}}{A_{s_1}} \cdot e^{-i k_1 (r_{s_1} + r_{d_1})} = A_0 \cdot e^{-i k_1 \cdot 2 f(r)}$$

Solving this equation results in $$f(r) = \frac{\operatorname{mod}[k_1 \cdot (r_{s_1} + r_{d_1}), 2\pi]}{2 \cdot k_1}.$$

This characterises the remainder of an integer function (modulo function) where in general mod [a,b] gives $$f(r) = \frac{a}{b} - \left\| \frac{a}{b} \right\|$$

Figure 3:
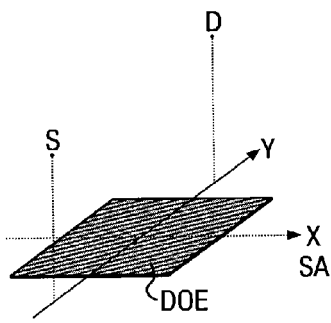
Figure 5A:
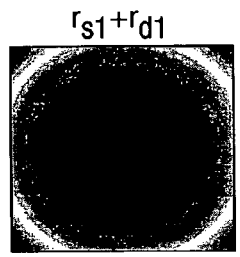
Figure 5B:
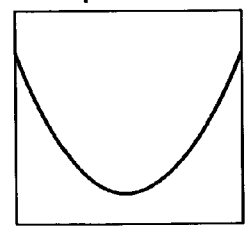

The following system geometry which is shown in FIG. 3 where SA as before indicates the scanning axis may now be considered. FIG. 3 is also related to that which can be seen from and will be described in connection with FIGS. 5, 6 and 7. FIGS. 5a and 5b show the phase for the reflectance function t(r) before it is cut off to obtain the DOE profile, and where FIG. 5a indicates the function $r_{s_1} + r_{d_1}$, and where FIG. 5b indicates distance along the DOE profile.

Figure 4:
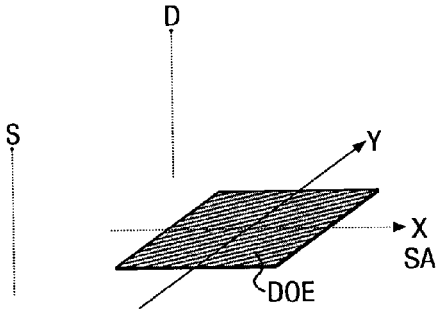
Figure 6A:
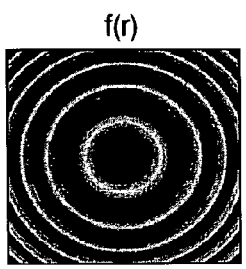
Figure 6B:
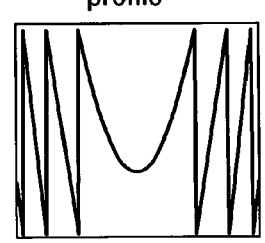
Figure 7:
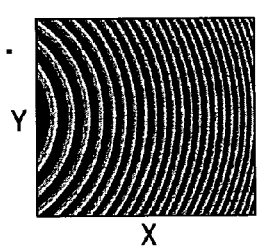

FIG. 6a shows the DOE profile which in this case is a central part of the Fresnel zone plate. FIG. 6b shows the distance along the profile. The result is per se in accordance with expectations. Nevertheless, the central part of a Fresnel zone plate is known to give wavelength—independent direction dispersion, so that any wavelength coming from the source would focus at the same location on the detector. By shifting the source S and the detector D to the left, see FIG. 4, the DOE profile will then be the off-axis part of a Fresnel lens as shown in FIG. 7, which thus shows the outer part of the Fresnel zone plate. This profile is now wavelength-dependent, and a wavefront having wavelength $\lambda_1$ coming from the source is imaged on the detector, and the other wavelengths will focus on different locations. This also applies in general to multiple wavelength cases and the chosen geometry is as shown in FIG. 3.

A brief description will now be given of the two wavelength case where it is simultaneously desirable to image $s_1$ (wavelength $\lambda_1$) on $d_1$ and $s_2$ (wavelength $s_2$) on $d_2$. The DOE optical reflectance should then be:

$$t(r) = D_1 \frac{S_1^*}{|S_1|^2} + D_2 \frac{S_2^*}{|S_2|^2} \quad (6)$$

Figure 8:
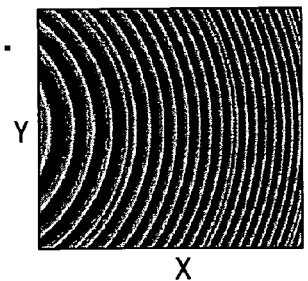

Here, consideration may be given to one particular case as shown in FIG. 8 where $r_{s_1} = r_{s_1}$ and $r_{d_2} = r_{d_2}$. Two wavelengths $\lambda_1$ and $\lambda_2$ coming from the source S are imaged on the detector D. FIG. 8 thus shows the DOE profile in this case. It can be seen that it resembles a type of mixed patterns between two Fresnel zone plates.

Figure 9:
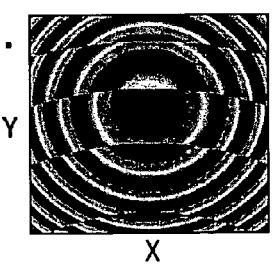

The other example can be seen from FIG. 9 where the calculation has been based on that which is evident from the geometry in FIG. 3. The result given here will be easier to interpret as two mixed Fresnel zone plates and the curves separating the two Fresnel zone plates have different radii. However, all these curves are tangent to the direction of the scanning axis (the axis in the X direction).

Figure 10:
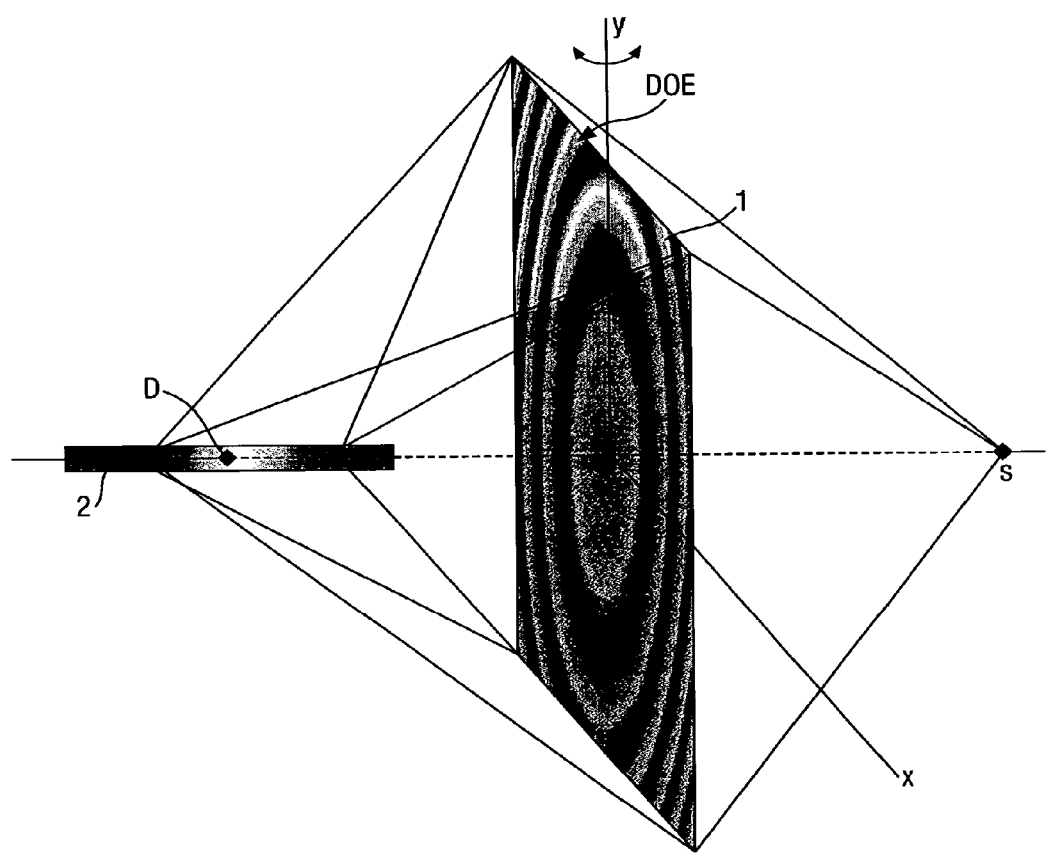

Further aspects of the present invention will now be described in more detail, starting from FIG. 10 where light is emitted from a source s through a diffractive optical element DOE, in this figure indicated by means of the reference numeral 1, towards a detector D which is capable of detecting the spectrum 2 that is produced.

By, for example, turning the element 1 about the axis y, the spectrum 2 will move relative to the detector D.

Figure 11:
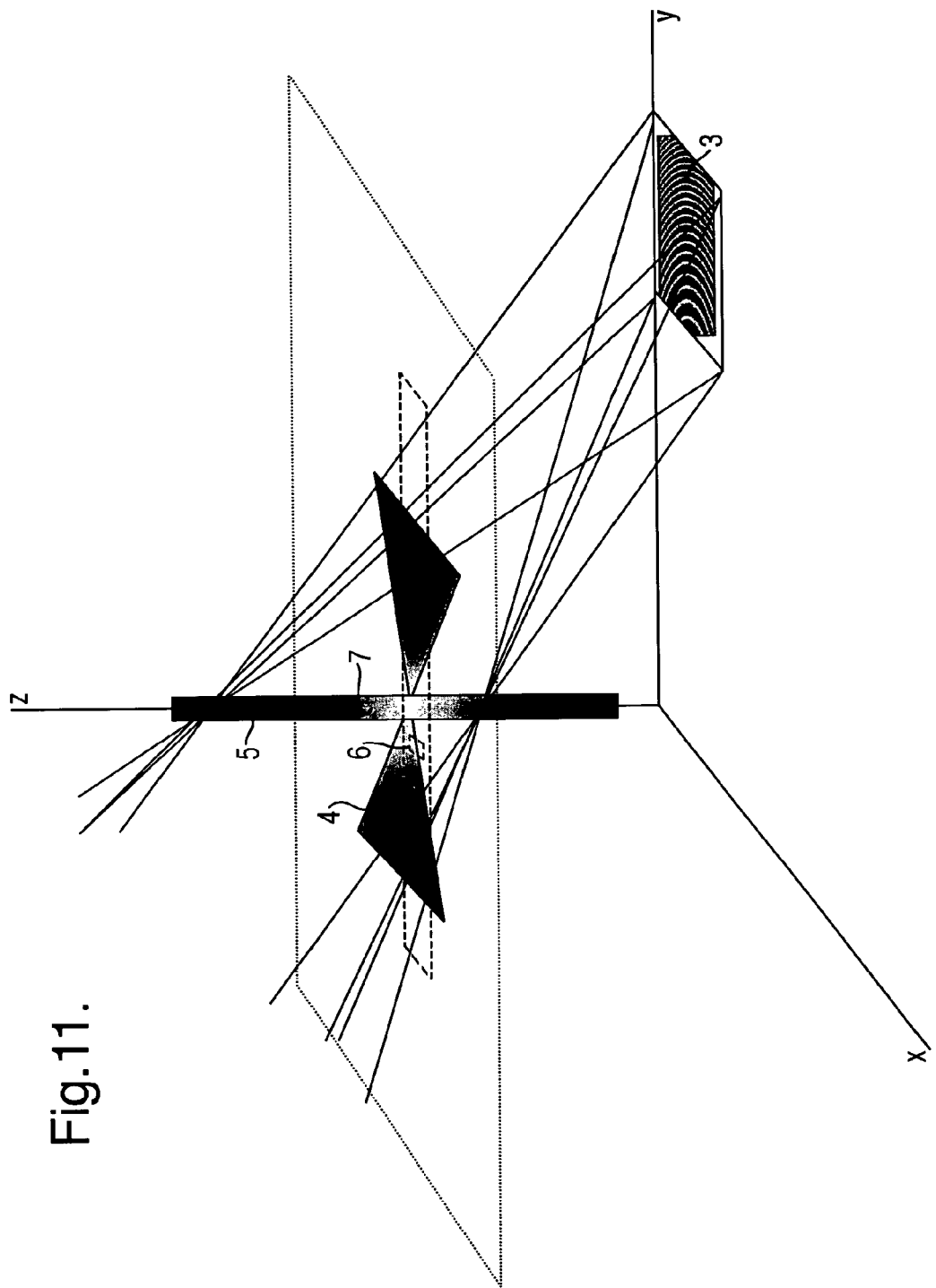

FIG. 11 shows a modified diffractive optical element 3. When light is sent towards the element 3, preferably from a point source and is either transmitted through the element 3 or is reflected thereby, a spectrum 4 in a plane parallel to the element 3 will be produced, and it will be seen that this is not wholly rectangular, which is due to the prevailing geometry. Alternatively, a spectrum 5 which is parallel to the z-axis can be produced. Here, it will also be appreciated that if a detector 6 or a detector 7 is provided, the spectrum 4 or 5 will shift when the element 3 is subjected to a tilting motion. In this way, the detector 6 or 7 can detect the actual location of said spectrum.

Figure 12:
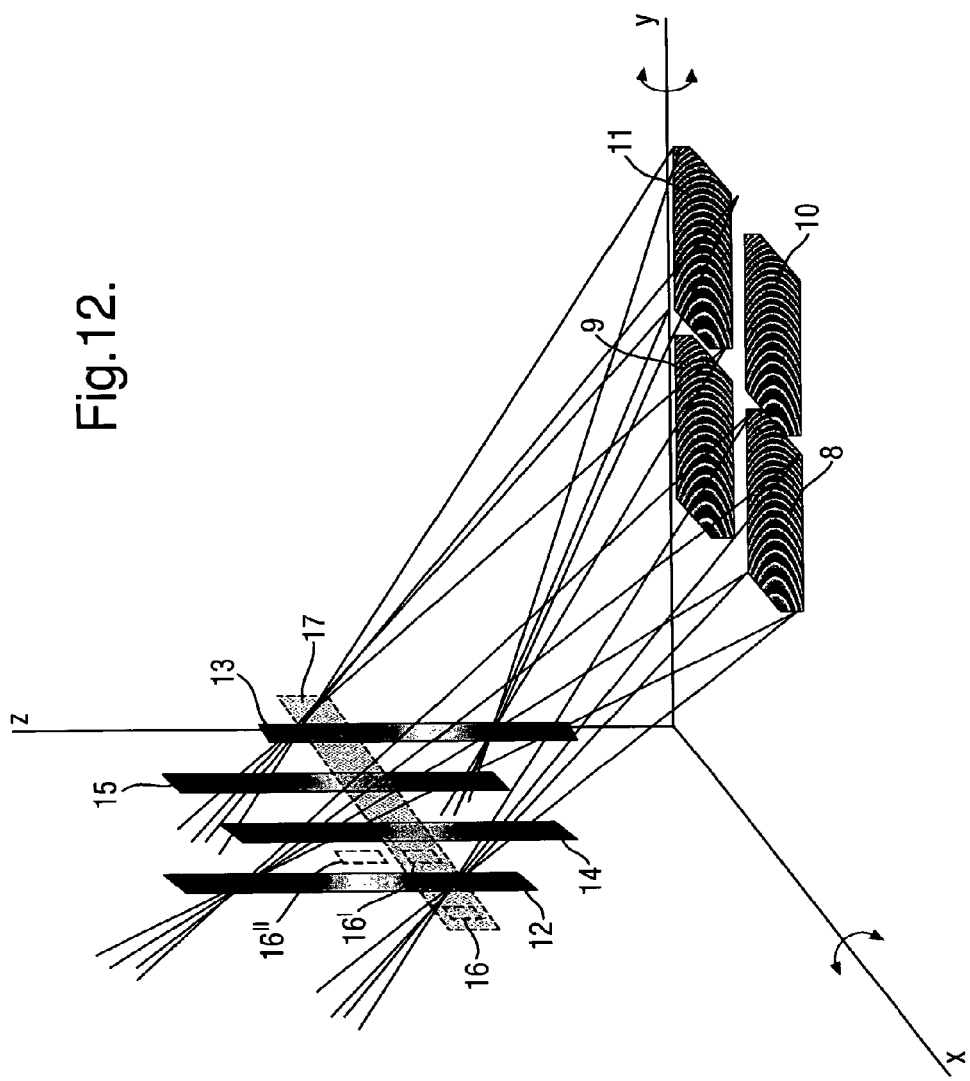

If this principle is taken further, as shown in FIG. 12, and where a plurality of diffractive optical elements 8, 9, 10 and 11 are provided, it will be seen that each of these produces respective spectra 12-15. The detection region of the detector 16 is indicated by the reference numeral 17. It will be understood that although just one detector 16 is shown, there could be two or more detectors in the detection region 17.

The elements 8-11 show solely as an illustration typical axis-offset Fresnel zone plate fragments, and although on the drawing these appear to be identical, it will be understood that they must be different from one another in order to obtain the alleged desired effect according to the invention.

If the elements 8-11 are tilted collectively about the x-axis, the said spectra 12-15 will move transverse to the detector field 17. However, if the elements 8-11 are tilted about the y-axis, the said spectra 12-15 will move together along the detector field 17 and successively pass the detector 16. Thus, it will be appreciated that for an effective detection of the spectra 12-15, either the detector 16 must be moved along the field 17 or the elements 8-11 must be tilted about the y-axis so as to pass over the detector 16 successively with a respective region of the said spectra. If, for example, more than one detector is used, a detector like detector 16' can be provided.

Figure 13:
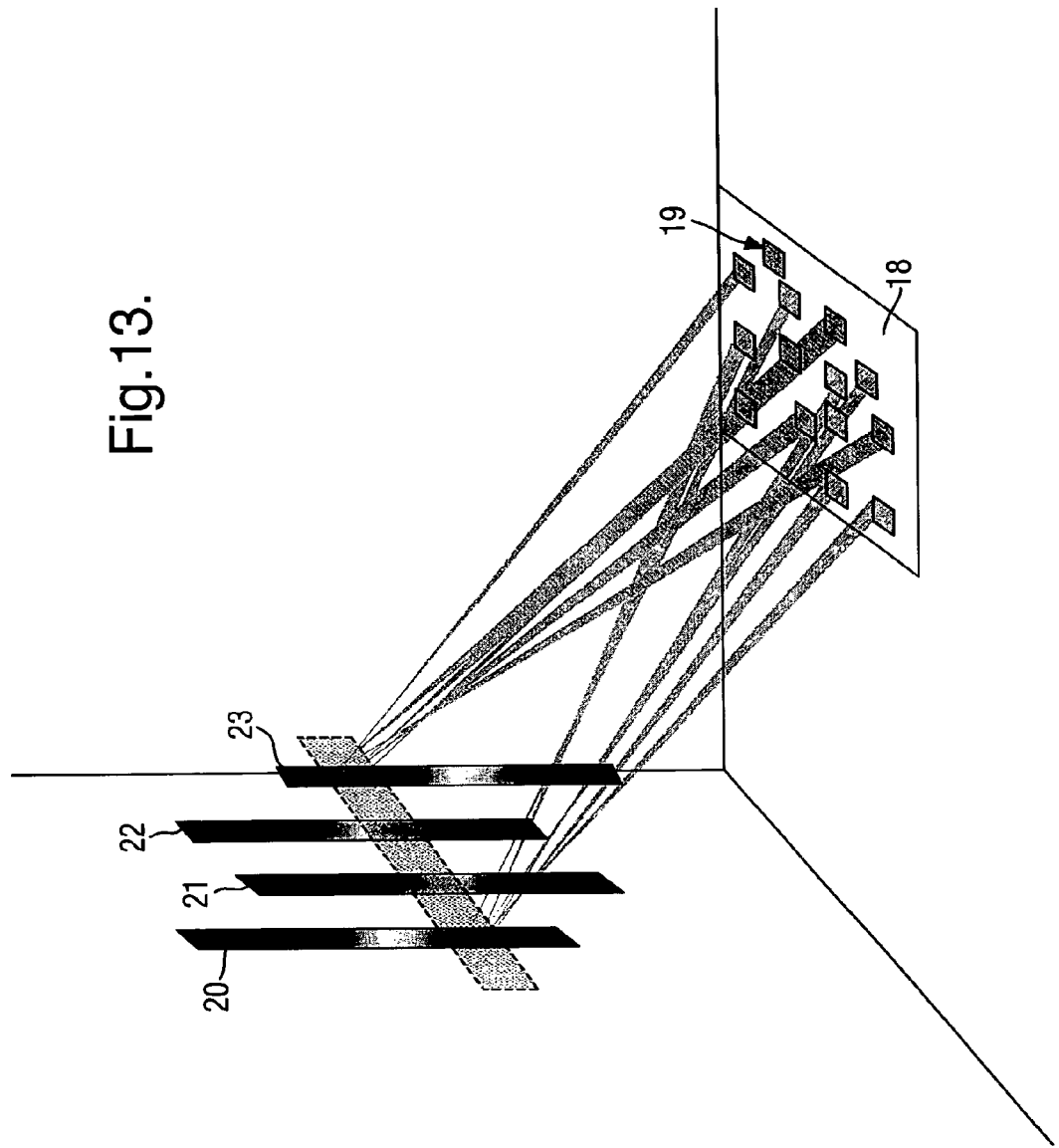

With further reference to FIG. 13, it will be seen there that the diffractive optical element 18 is divided into a plurality of smaller diffractive optical elements 19, of which only a small number are shown for the sake of clarity. It will be seen that some of the diffractive optical elements 19 form certain parts of a spectrum, whilst others will form other parts of a spectrum when light illuminates the element 18. Thus, FIG. 13 can be considered to be composed of a plurality of elements, like those of the type of elements 8-11 shown in FIG. 12. In this way, a whole diffractive optical element 18 is obtained which has a plurality of diffractive dispersive element patterns 19, preferably partly integrated into one other, whose respective centers are, as is evident from FIG. 13, two-dimensionally offset relative to each other in order to produce a plurality of spectra, where at least two are separate, but offset relative to each other and/or partly overlapping. From FIG. 13 it will be seen that the spectra 20-23 shown in the figure are separate and offset relative to each other, but not necessarily overlapping.

Figure 14:
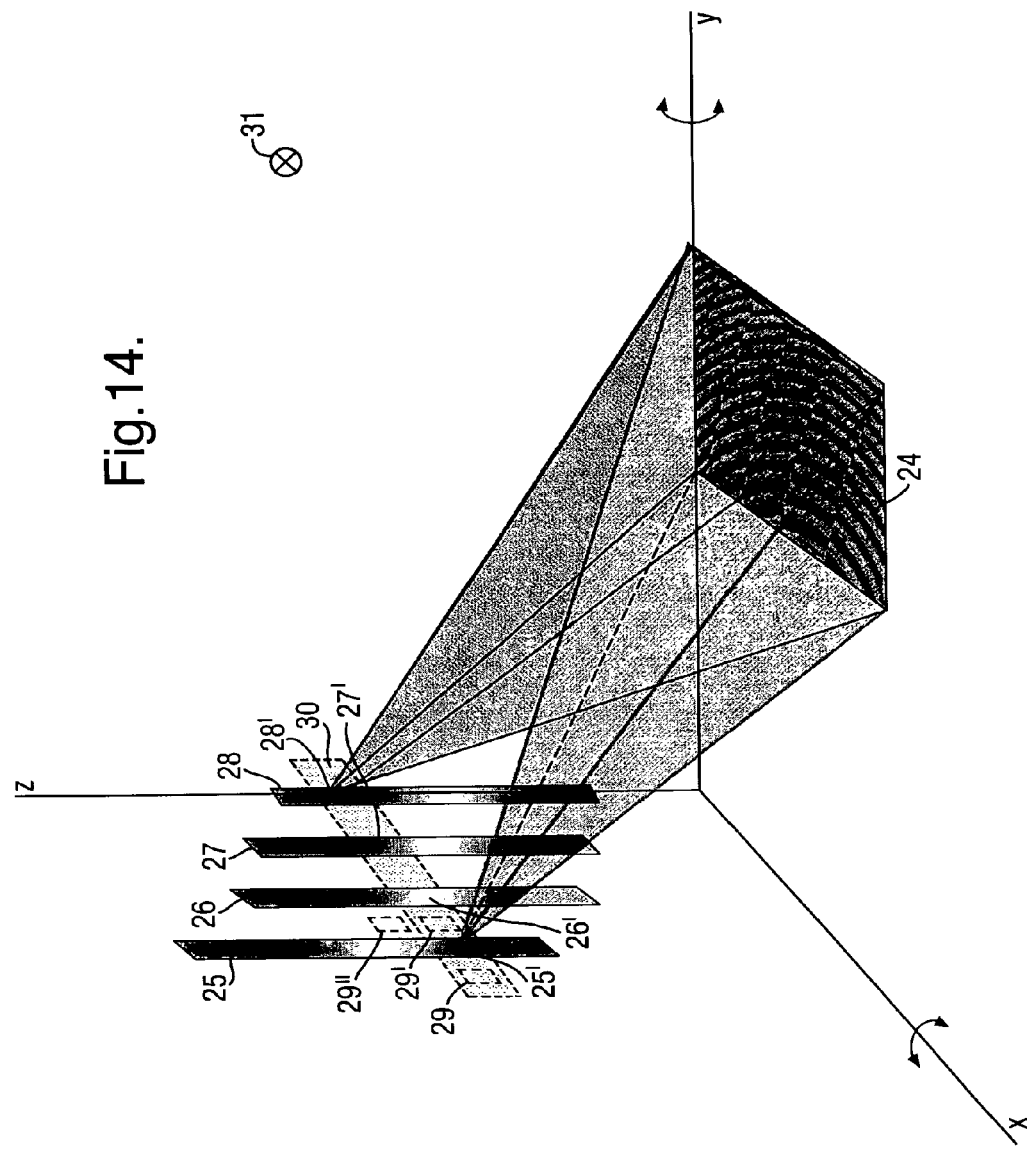

FIG. 14 shows a further step towards integrating the different diffractive optical elements into a composite element, like the diffractive optical element indicated by the reference numeral 24 in FIG. 14. It will be seen that in the illustrated example this element, when exposed to light, generates four spectra 25-28. The optical element 24 thus has a plurality of diffractive, dispersively focusing patterns, preferably partly integrated into one another, whose respective centers, as can also be seen clearly from FIG. 12 and also from FIG. 14, are two-dimensionally offset relative to each another, so that said plurality of spectra 25-28 are produced, where at least two of these are separate, but offset relative to each other. One or more detectors 29, 29', 29" can be provided with an associated detection field 30. When the optical element 24 is caused to rotate about at least a first axis y, the said at least one detector 29, 29', when the element 24 is tilted, will be caused to detect a first set of different spectral ranges indicated by respective reference numerals 25', 26', 27', 28' in respective ones of said separate spectra 25-28. It is also conceivable that the element 24 could be rotatable about a second axis x which is orthogonal to the first axis y, so that said at least one detector 29, 29' upon said tilting is caused to detect at least a second set of different spectral ranges in respective ones of said spectra 25-28, the detection field 30 remaining unchanged in the z direction, whilst the tilting of the optical element 24 about the axis x causes the said spectra 25-28 to be shifted slightly transverse to the detection field 22, i.e., in the direction of the z-axis. An alternative to moving the element 24 about a first axis y is, of course, to keep the optical element 24 still and instead move the detector or detectors 29, 29' in the x direction, i.e., transverse to the spectral bands 25-28 of the said separate spectra. In addition, it will also be possible to move the detection field with the detectors 29, 29' and optionally more or fewer detectors in the direction along the said spectral bands 25-28.

A further alternative would be to make the position of a light source 31 adjustable in the direction of said spectral bands, in order thereby to change the position of the detectors or the position of the detection field relative to said spectra 25-28. However, it is noted that both the detectors 29, 29' and the light source 31 are connected to electrical connections which may make it inconvenient to mechanically shift their positions, whilst the element 24, on the other hand, does not have any active parts and thus is easier to move.

Figure 38:
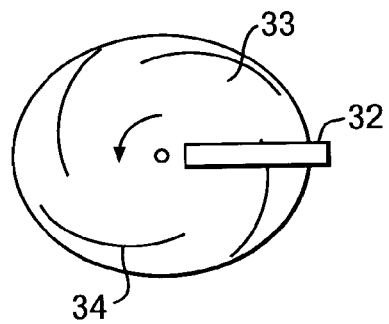
FIG. 38 shows a means moving a light source.

The light source 31 will preferably emit light through a fixed, preferably small aperture 32 (see FIG. 38) and a rotating disc 33 can be provided with at least one slit 34 or a plurality of minute holes, so that light can pass through the slit or the said holes whilst the slit or holes, because of their arc-shaped arrangement on the disc, travel across the length of the aperture 32 as the disc rotates.

Figure 29:
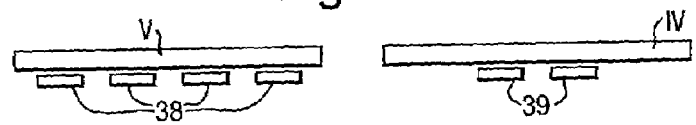
Figure 39A:
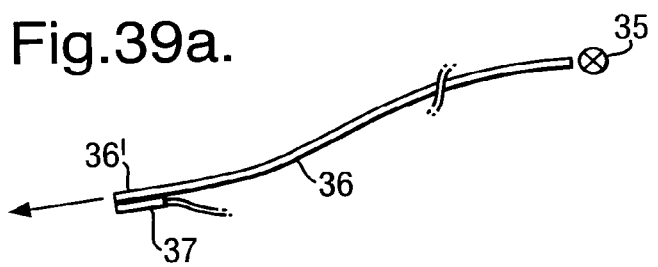
FIG. 39a shows an alternative means for moving a light source.

As an alternative, the light source, indicated by means of the reference numeral 35 in FIG. 39a, can emit light via an optical fibre 36 which is mechanically movable, for example, by exciting a piezoelectric element 37 to which the end portion 36' of the optical fibre is attached. As indicated in FIG. 29, there can optionally be provided at least two detectors, such as detectors 38 or 39 shown in FIG. 29 in the direction of the spectral bands of the spectra. The output from the said at least two detectors may optionally be collected by time-multiplexing.

Figure 39B:
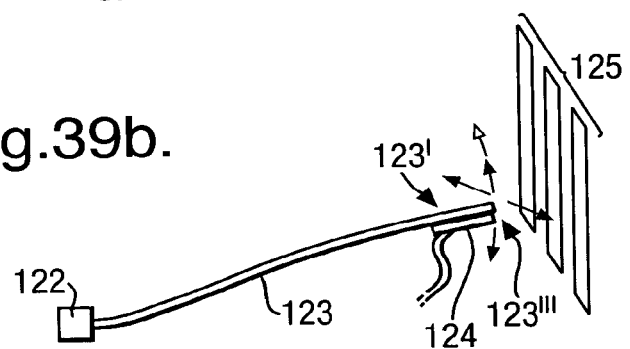
FIG. 39b shows a means for moving a detector in relation to a plurality of spectra.

It is also conceivable that this principle involving the use of an optical fibre or light guide can be used on the detector side, as indicated in FIG. 39b where a detector 122 via a light guide 123 scans at least two spectra 125 lying in the focus plane of the end 123' of the light guide, and where a means 124, for example, a piezoelectric element, when excited, causes the end portion 123' of the light guide to move either across the said spectra or optionally along said spectra.

Figure 17:
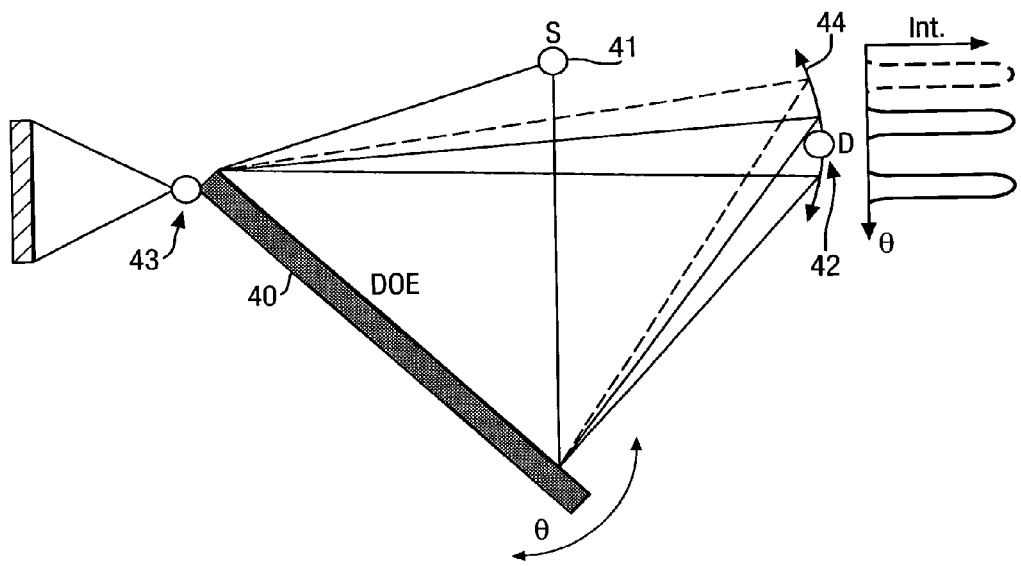

As previously indicated, it would be advantageous to allow the diffractive optical element to be subjected to a tilting motion so as to effect scanning through the desired parts of the separate spectra. FIG. 17 outlines this in more detail, where the reference numeral 40 designates a diffractive optical element, and where the light source, which optionally emits its light via a slit as previously described, is indicated by means of the reference numeral 41. The detector is indicated by the reference numeral 42. The diffractive optical element 40 has its centre of tilt preferably at an end portion thereof, as indicated by the centre of tilt 43. In this solution, the desired, measured wavelengths will be focused on a curve 44, so that they hit the detector in the centre when scanning takes place through an angle θ. It should be noted, however, that the spectrum in the plane is not necessarily continuous as can be seen in a grating spectrometer, but will consist of predefined wavelengths, and these wavelengths do not need to be in rising or falling order. This is also in a way shown clearly in, for example, FIG. 14. The intensity of the measured spectrum as a function of the scanning angle θ can be seen clearly at the top to the right in FIG. 17.

As previously indicated, it is conceivable that the diffractive optical element is based on either reflection of light or transmission of light. Gratings will either modulate the amplitude or the phase of an incident ray of light. A phase grating will give the highest diffraction efficiency. Moreover, this type of diffractive element could easily be replicated in a compact disc substrate in large quantities by pressing or another form of replication, i.e., at low individual cost.

The case in FIG. 15 will first be described. Given that Pr(x) represents the grating element profile, n is its refraction index and the constant $$k = \frac{2\pi}{\lambda},$$

the phase profile produced by a grating of this kind will be $\Phi_{grating}(x) = -2k \cdot Pr(x)$.

The tilting of the incident field (respectively the grating) will have the following effects:

$\Phi_{tiltfield}(x) = -k \cdot x \cdot \sin(\alpha)$ $\Phi_{tiltgrating}(x) = 2k \cdot x \cdot \sin(\beta)$ Finally:

$\Phi_{Reflective}(x) = \Phi_{Grating} + \Phi_{tiltField} + \Phi_{tiltGrating}$

Figure 16:
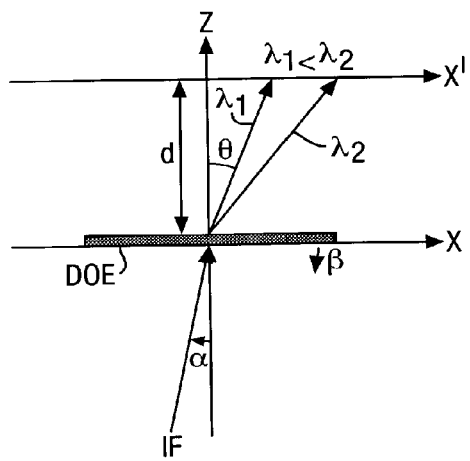

Similarly, for that shown in FIG. 16 the following is obtained:

$\Phi_{grating}(x) = k \cdot (n-1) \cdot Pr(x)$

The tilting of the incident field (respectively the grating) will have the following effects:

$\Phi_{tiltfield}(x) = k \cdot x \cdot \sin(\alpha)$ $\Phi_{tiltgrating}(x) = -k \cdot x \cdot \sin(\beta)$ Finally, the following is obtained:

$\Phi_{Transmission}(x) = \Phi_{Grating} + \Phi_{tiltField} + \Phi_{tiltGrating}$ It will be noted that the signs for the reflection case are the opposite of the transmission case, since the propagation is towards the negative z values.

If a structure is set up in fraction form, where n≈1.5, the following is obtained:

$$\frac{\Phi_{Refl.grating}}{\Phi_{Transm.grating}} = \frac{2 \cdot k \cdot Pr(x)}{(n-1) \cdot k \cdot Pr(x)} = \frac{2}{n-1} \approx 4$$

From this it may be concluded that the same grating profile Pr(x) generates a phase function Φ(x) which is four times greater in the reflective grating than for the transmission grating case. A tilt angle θ of the transmission grating will shift the spectrum by an angle of less than θ, whereas an angle tilt at an angle θ for the grating case of a reflective grating will shift the spectrum through an angle of 2θ. The scanning in wavelength thus requires a tilt of a transmission grating that is more than twice that required for a reflective grating. Thus, in the case of the present invention, it will be advantageous to apply the principle of the reflective grating, although a grating solution for a diffractive optical element based on transmission is of course also possible.

Figure 15:
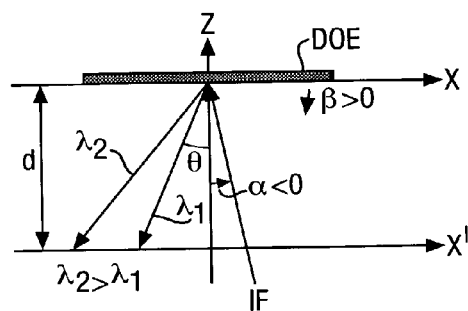

In FIGS. 15 and 16, the incident light field is indicated by the letters IF and the optical element or the grating is indicated by the reference DOE.

Figure 37:
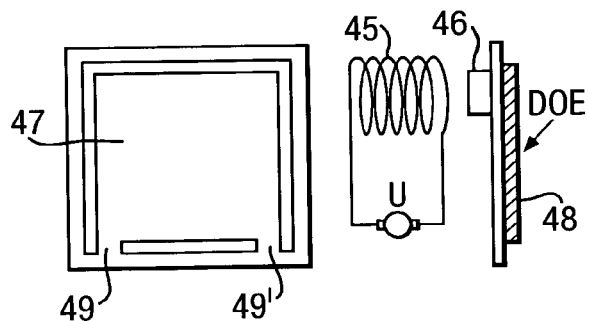
FIG. 37 shows by way of example a means for tilting a diffractive optical element.

Tilting of the diffractive optical element can be effected, for example, by using a construction as shown in FIG. 37. A coil 45 is excited by a pulsing or periodically varying voltage U and will manipulate an anchor 46 fastened to a tiltable plate 47 to which the diffractive optical element, here indicated by the reference numeral 48, is attached. In this way, the diffractive optical element 48 will tilt about centers of tilt 49, 49'.

Alternative solutions to that shown in FIG. 37 are of course conceivable, for example, by using a piezoelectric element which can cause a tilting motion, or by attaching the diffractive optical element 48 to a condenser plate that is subjected to vibrations.

As previously indicated, it would be useful to use a part of a Fresnel zone plate which is offset from the optical axis of the Fresnel zone plate in order to obtain diffraction.

Figure 18:
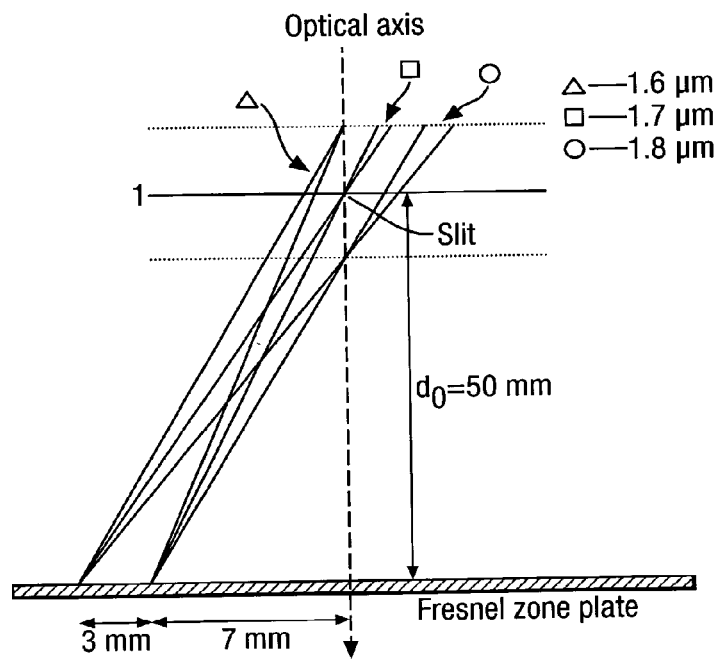

FIG. 18 shows wavelength focus dependency for a Fresnel zone plate. The rays are drawn only for the part of the Fresnel zone plate that is offset from its optical axis. Here, a focal plane having wavelength 1.7 μm (plane 1 in FIG. 18) can be taken as a starting point. In this plane, the wavelength of 1.7 μm focuses on the optical axis, whilst the wavelengths of 1.6 μm and 1.8 μm are slightly defocused and off-axis. Here, it can be concluded that the off-axis part of the Fresnel zone plate acts as a dispersive element with a focusing effect.

Figure 19:
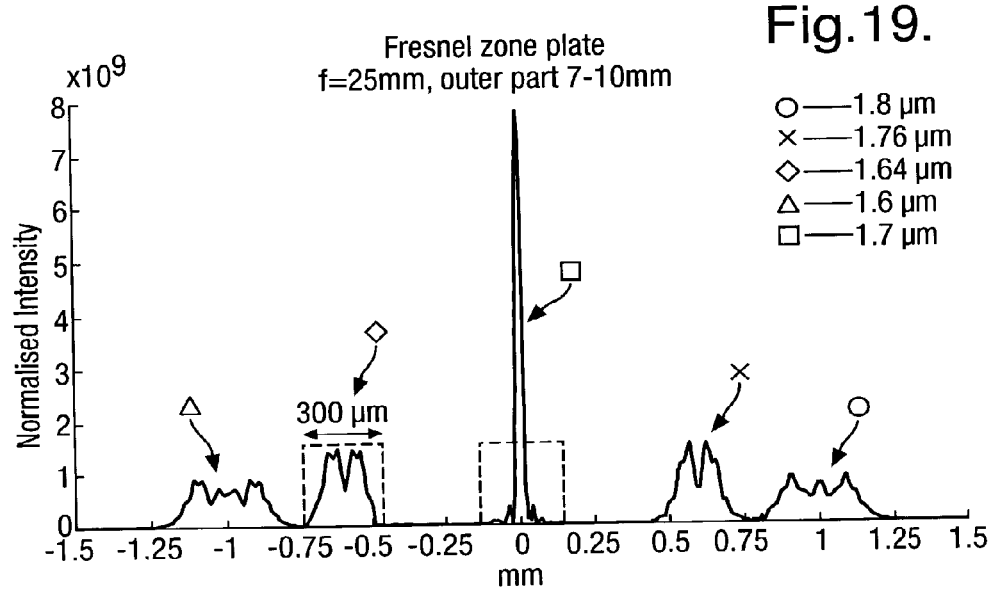

FIG. 19 shows the intensity distribution in the plane 1 for different wavelengths when using a 3 mm off-axis part of the Fresnel zone plate. The integrated energy at a detector in the wavelength range 1.64 μm-1.76 μm is constant in FIG. 19. If, for example, a 3 mm×10 mm element optimised for 1.7 µm is used, the intensity will inevitably be reduced at other wavelengths. The squares indicated in broken lines in FIG. 19 symbolise detectors which may be about 300×300 µm² in size. The detector size indicated here limits the resolution to 25 nanometers. A smaller detector would inevitably give a higher resolution of the indicated wavelength of 1.7 µm. The values given should thus simply be understood as examples which illustrate these aspects of the invention.

Figure 20:
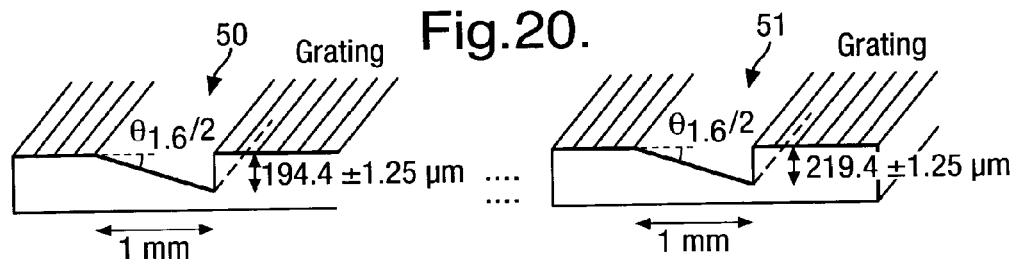
Figure 21:
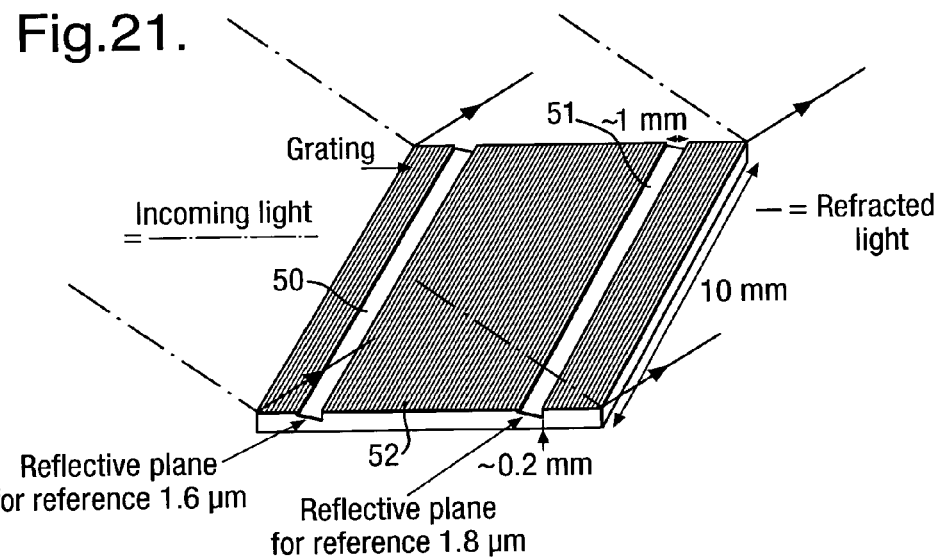
Figure 22:
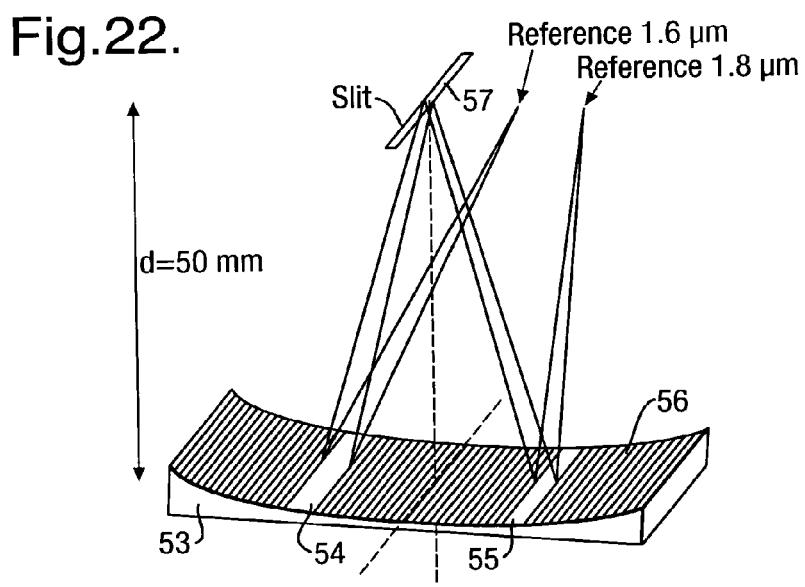
Figure 23:
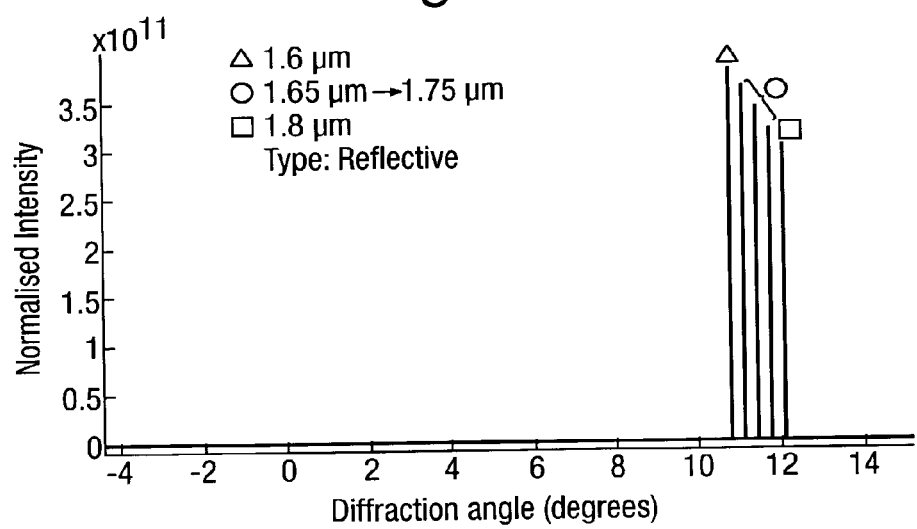
Figure 24:
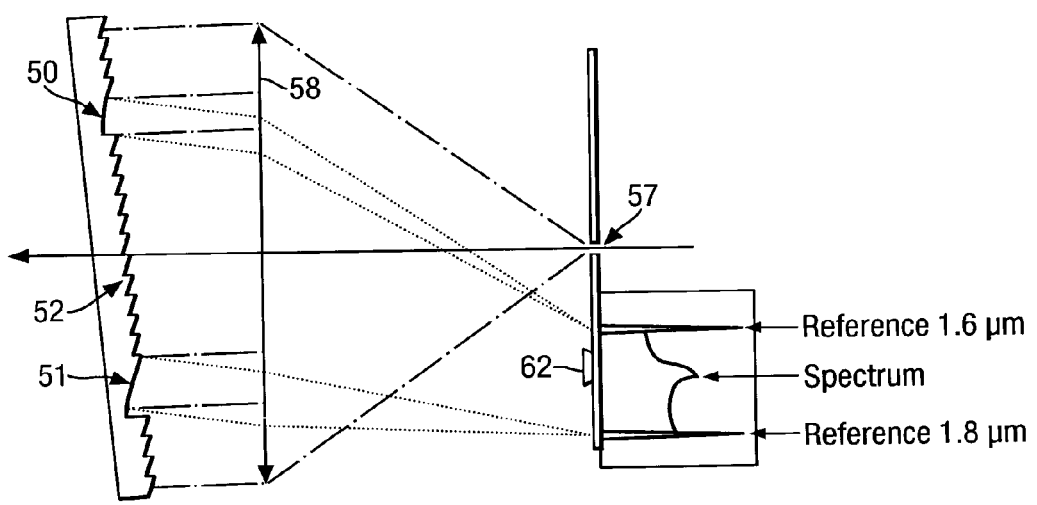
Figure 25:
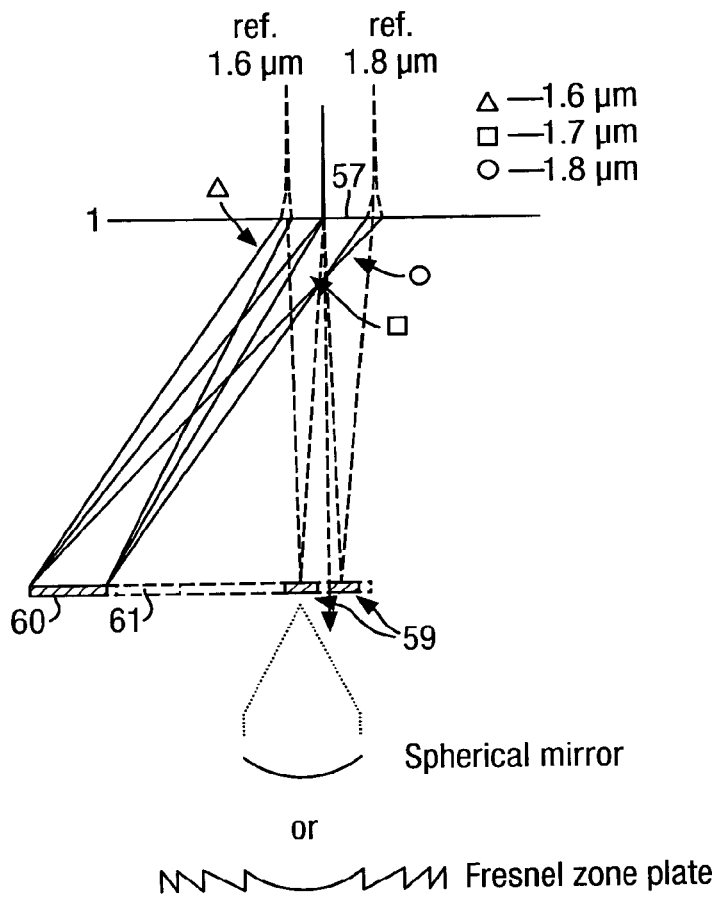
Figure 26:
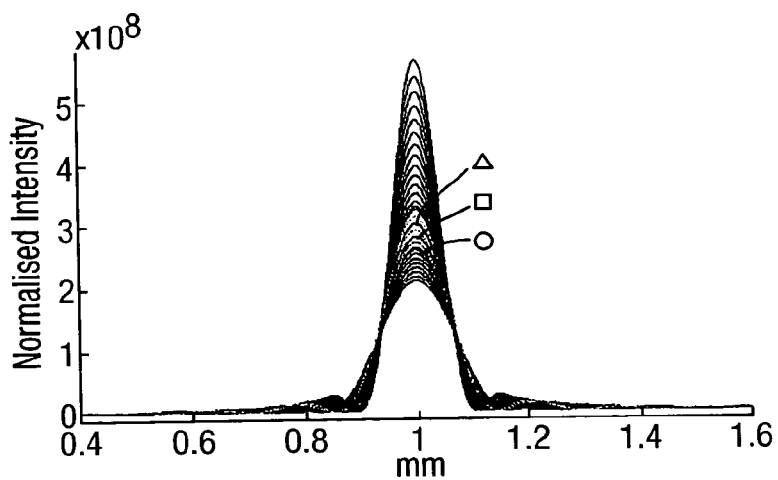

A diffractive element of this kind is shown in more detail in FIGS. 20 and 21 where typical, yet for the invention non-limiting, dimensions are given. There are two reflective planes 50, 51 in connection with the diffractive optical element 52. The two reflective planes 50, 51 for respective reference markings 1.6 µm and 1.8 µm in the chosen example function in effect like a mirror. Their slopes are calculated so that the light reflected on these planes will focus on the location for the 1.6 µm and 1.8 µm rays. It is also conceivable that the diffractive optical element or the grating could be provided with engraving on a concave substrate 53 in order to form a grating 56 or optical element, and where the substrate conjugates a slit 57 to the detector (not shown), see FIG. 22. The distance between the slit and the grating in the chosen example is shown to be d=50 mm and the radius of the concave substrate should thus be 50 mm. In this configuration, an intermediate lens is dispensed with, and the reflective planes 50, 51 as shown in FIGS. 20 and 21 thus become tilted concave mirrors. FIG. 24 shows the design described in connection with FIGS. 20 and 21 where it will be seen that the spectrum imaged by means of the reflective planes for the references 1.6 µm and 1.8 µm are given references at certain parts of said spectrum, so that a detector can quite unequivocally determine where in said spectrum there is, for example, a signal peak. Here, it will be seen that a lens 58 has been used, which was avoided in the solution shown in FIG. 22. For a reflecting diffractive optical element within the range of 1.6 µm to 1.8 µm and for a given grating or element, the spectrum which is generally obtained will be produced as indicated in FIG. 22. Although it is possible to use reflective planes 50, 51 in connection with a diffractive optical element, it is also possible to use spherical mirrors or a Fresnel zone plate centre region to provide the said references for 1.6 µm and 1.8 µm in the chosen example. The diffractive optical element for producing a desired spectrum will be off-axis relative to the optical axis of an ideal Fresnel zone plate. This is more evident from FIG. 25. The reference elements in FIG. 25 are indicated by the reference numeral 59 and the diffractive optical element which is off-axis is indicated by the reference numeral 60. If a spherical mirror is used for the reference elements 59, it will have the advantage that such mirrors are achromatic. FIG. 26 shows in this connection the diffraction pattern for a central Fresnel zone plate which acts as a reference for λ in the range 1.2-2.0 µm and with a resolution of about 30 nanometers.

Figure 27:
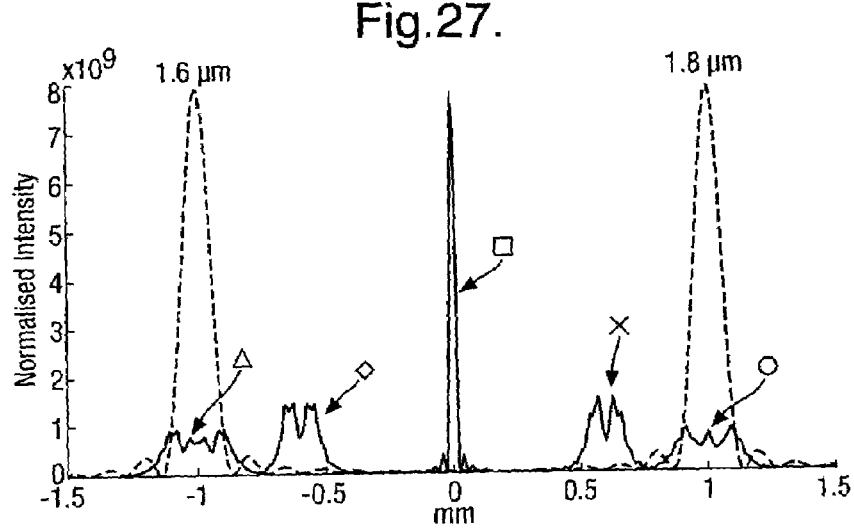

The total reference intensity will be the sum of all these contributions and its peak intensity will correspond to the intensity of the central ray at λ=1.7 µm (see FIG. 19). The plot in FIG. 19 now becomes the same as that seen in FIG. 27, i.e., with clear markings for the wavelengths 1.6 µm and 1.8 µm respectively. By making a mosaic of different elements, it is possible to make the intensity distribution more uniform. However, the drawback of such a solution is a more asymmetrical distribution of each wavelength, which means, for example, that λ=1.8 µm will have small contributions from 1.77 µm and 1.83 µm. It will be possible to reduce the intensity by unfolding the dispersive effect in the x-axis direction for a diffractive optical element which, for example, is 1 mm×10 mm, and also the geometrical effect of using a 10 mm part of a Fresnel zone plate in the y-axis direction, so that the reduction in intensity can be calculated. If such an element is optimised for, e.g., 1.7 µm, the intensity at 1.6 and 1.8 µm will be reduced to 50%. This can be verified by calculating the amount of energy cone that geometrically hits the detector in the y direction, as different wavelengths have different focal lengths in the y direction. To reduce the variation, three different elements, each 1 mm and with different design wavelengths, are put together in a mosaic. The reduction at 1.6 and 1.8 µm will then be only 15%, giving a rather flat response over the wavelength region that is of particular interest. Like the solution described above, the optical element can be tiltable in at least a first plane, so that said at least one detector which will be involved when the element is tilted will be caused to detect successively different spectral regions in said spectra or a composite spectrum. A composite spectrum can be obtained by using several diffractive optical elements 60, 61. This may be an advantage in order to obtain a spectrum of maximum uniformity over the wavelength range in question. As an alternative, the said at least one detector, as for instance the detector 62 shown in FIG. 24, can be movable along the spectral bands of said spectra or composite spectrum. However, as suggested earlier, it will be more preferable to use a tiltable optical element instead of moving the detector.

In FIGS. 28 and 29, IV denotes invisible spectrum, whilst V indicates visible spectrum. For the two primary alternative embodiments of the invention, the said spectra can lie in a visible and/or an invisible spectral range. The said spectra may thus be selected from the group consisting of: invisible spaced apart spectra; visible spaced apart spectra; invisible contiguous or partly overlapping spectra; visible contiguous or partly overlapping spectra; visible and invisible spaced apart spectra and invisible and visible contiguous or partly overlapping spectra.

Figure 28A:
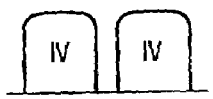
Figure 28B:
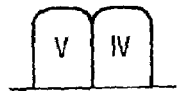
Figure 28C:
Figure 28D:
Figure 28E:
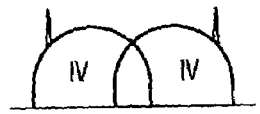
Figure 28F:

In connection with, for example, colour detection, it may be advantageous to use at least two overlapping visible spectra, as indicated in FIG. 28f, in order to be able to detect composite colours in the visible spectrum V. This can be provided, for example, by using two interadjustable diffractive optical elements.

In connection with, for instance, the visible spectrum, for example, for colour detection, it may be advantageous to use several detectors 38, whereas in the invisible spectrum a smaller number of detectors 39 can be used, as indicated in FIG. 29.

Practical solutions in connection with the present invention will now be described in more detail with reference to FIGS. 30-34.

Figure 30:
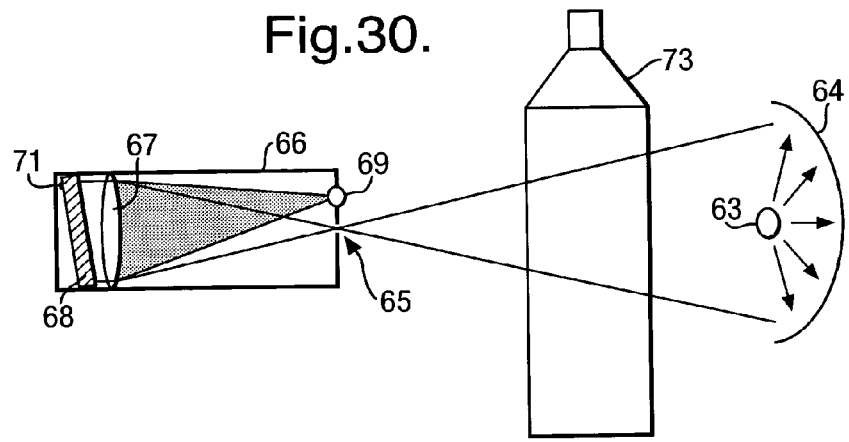

FIG. 30 shows a light source 63 which can emit light towards a reflective element 64 for focusing light towards a slit 65 in an apparatus housing 66 where the light in the chosen, non-limiting example hits a lens 67 and moves towards the dispersive optical element 68, from where light is guided towards a detector 69. The lens 67 and the element 68 may optionally be replaced by a dispersive, focusing, diffractive element (DOE). The slit 65 will preferably be small in size, as for example, yet non-limiting, in the order of 0.3×3 mm. It is also possible to allow the slit to be replaced by a rectangular, polygonal, round or oval aperture. Specific use of this solution may be relevant in connection with the embodiment shown in FIGS. 12-15. The detector 69 can, for example, be 0.3 mm in size. The actual housing 66 may, for example, be 60 mm×10 mm, although this should by no means be understood as defining the limits of the invention. To be able to limit light scatter, baffles 70 are placed in the housing 66, as shown in FIG. 31.

Figure 31:
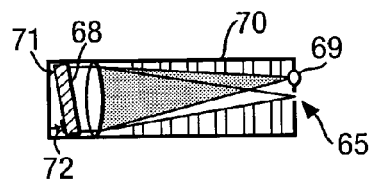

To be able to tilt the diffractive optical element about a tilt axis 71, a piezoelectric element 72 is provided at a second end of the element 68, as shown in FIG. 31, so that when the element 72 is excited, the element 68 will tilt about the point 71. A transparent or translucent medium, for example, fluid or article 73, can be introduced in the light path between the light source 63, 64 and the detector 69. Here, the spectrum or spectra that are displayed and detected by the detector 69 will be a function of the light absorption properties of said medium 73.

Figure 32:
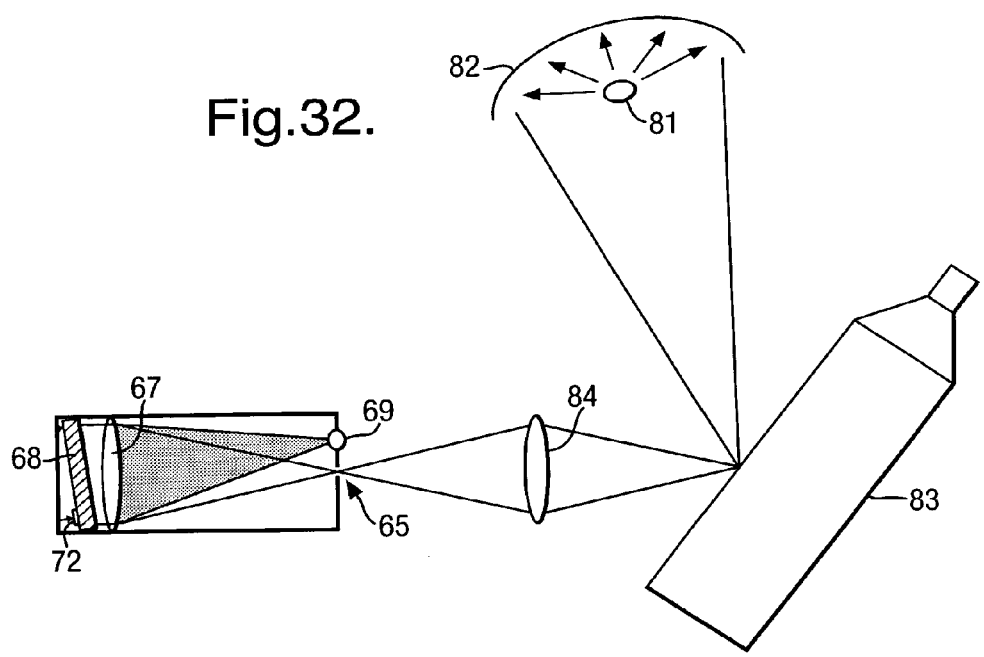
Figure 33:
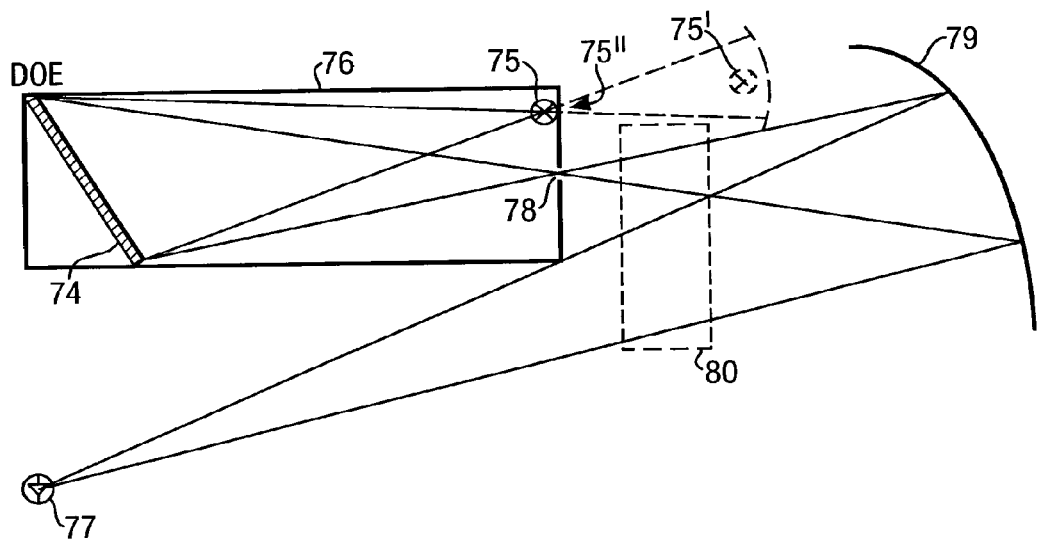

A variant is outlined in FIG. 33 where the optical element is indicated by the reference numeral 74, the light source by reference numeral 75, the apparatus housing by reference numeral 76 and the detector by reference numeral 77. As an alternative to the light source 75, an external light source 75' may be provided as shown in broken lines, and which via an aperture 75" in the housing 76 achieves the same as the light source 75. Light is emitted from the light source 75 via the diffractive optical element 74 via a slit 78 in the apparatus housing 76 towards a reflective element 79, so that the rays of light forming a spectrum hit the detector 77. In this case, it will be possible to introduce a transparent or translucent medium 80 in the light path between the optical element 74 and the detector 77, so that the spectrum or spectra displayed and detected by the detector 77 will be a function of the light absorption properties of said medium 80. In the event that the said medium, instead of being transparent or translucent, is essentially light-reflective, as indicated in FIG. 32, a light-reflecting medium 83, for example, fluid or an article, can be introduced into the light path between a light source 81 which has its light reflected by a reflector 82, and the optical element 68. Said medium 83 will thus reflect the light towards the optical element 68 via a lens 84 and the slit 65. The spectrum or spectra which thus are displayed and detected by the detector 69 will be a function of the light absorption and/or light reflection properties of said medium 83, and/or the luminescence or re-emission properties of said medium.

In connection with the embodiment shown in FIGS. 30 and 33, it will be understood that not only light absorption properties will be detectable, but also light reflection properties.

In the solutions shown in FIGS. 30-33, it is conceivable that the spectrum or spectra displayed may be a function of the luminescence or re-emission properties of the said medium. In this connection, it is envisaged specifically that the said medium may be a cellular liquid.

However, it is also possible that the said medium may consist of at least one of the following elements:

gas, biological material, composite waste, fluids, medical samples and preparations, foods, paper products, wood products, metals and/or alloys thereof, plastic materials, glass or articles of plastic or glass, e.g., beverage packaging.

In the case shown in FIG. 33, it is also possible to envisage that the said medium may, for example, be a gas, so that the housing 76, for example, is filled with this gas. In this case, it will be the absorption properties of the gas in particular that will be of interest.

Figure 34:
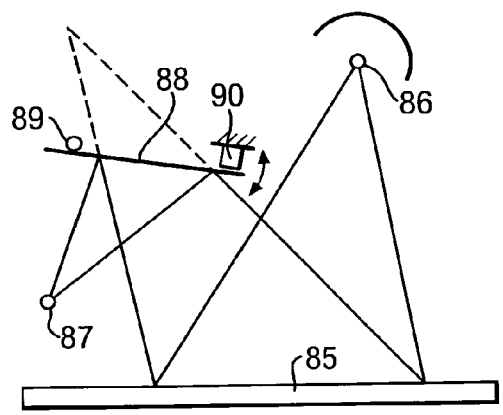
FIG. 34 shows an embodiment of the device where the diffractive optical element, light source and light detector are all stationary.

It is also possible that instead of moving the diffractive optical element, such as the element 85, shown in FIG. 34, in the light path between light source 86 and detector 87, a tiltable mirror 88 is provided. At a first end portion, the mirror 88 is pivotally mounted at a pivot point 89 and at second end it is connected to, for example, a piezoelectric element 90 which, when excited, will cause the mirror 88 to tilt about the point 89. Of course, it is possible that with some small modifications the light source 86 and the detector 87 can switch places without greatly affecting the measurement data obtained. It is thus conceivable that a tiltable mirror can be placed in the light path between the light source 86 and the diffractive optical element 85 and/or between the diffractive optical element 85 and the detector 87.

Figure 35:
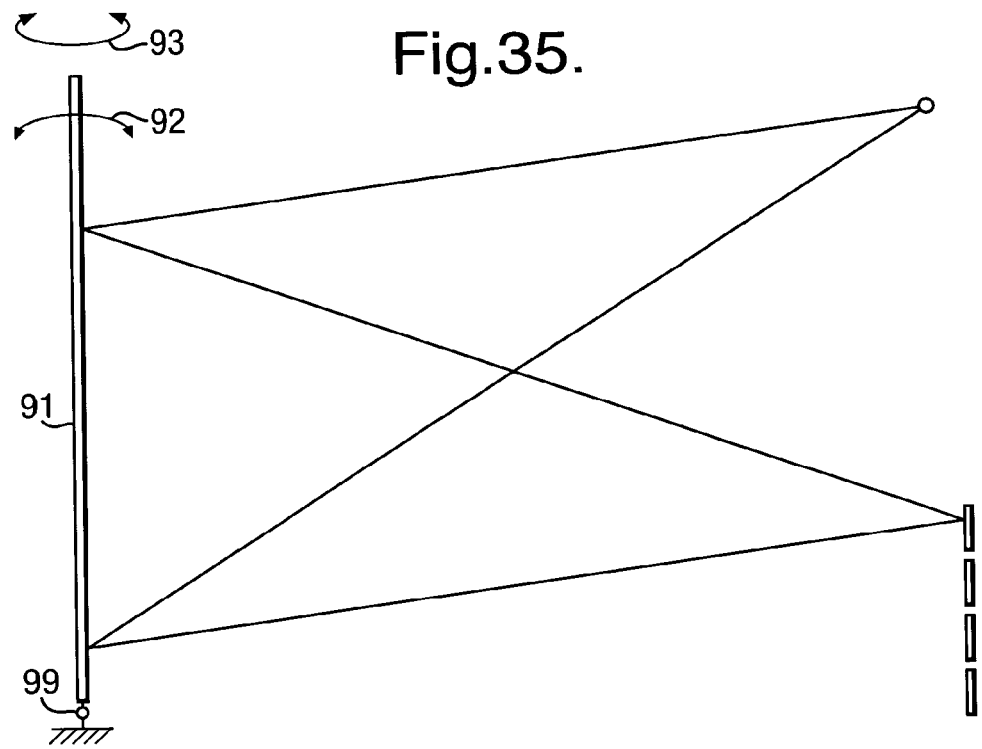
FIG. 35 shows an embodiment of the device where the diffractive optical element is movable about one or two axes, or where the light source is movable.
Figure 36:
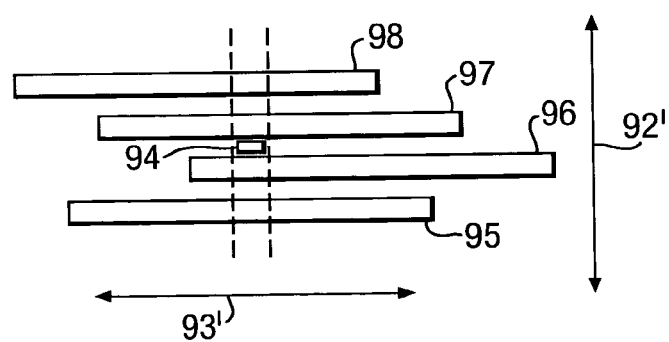
FIG. 36 illustrates possible two-way movement of a set of spectra in relation to a light detector.

FIGS. 35 and 36 illustrate the principle for the tilting and optionally the rotation of an optical element 91. A tilting of the element 91 in the direction of the arrow 92 will result in the spectra 95-98 moving in direction 92', and rotation of the element in the direction of the arrow 93 will result in the spectra 95-98 moving in direction 93'. Thus, it will be understood that it is possible by tilting in direction 92 to cause a predetermined region of a respective spectrum 95-98 to be successively passed over a detector 94, whereas rotation in the direction of arrow 93 will cause a respective other region of each spectrum 95-98 to be passed over a detector when the tilting in direction 92 takes place about a tilt axis 99.

FIG. 40 shows a light source 100 which transmits light towards a plurality of diffractive optical elements 101, 102, 103 and 104 in the form of Fresnel zone plate fragments. A spectrum is produced from each element, but for the sake of simplicity and clarity only two spectra 105 and 106 from the elements 104 and 101, respectively, are shown. It will be seen that the spectrum 106 lies to the side of the spectrum 105 and is also indicated more faintly, which indicates that the spectrum is out of focus in relation to the dark field 109 which represents a light detector. It is also seen that the elements 101, 102 and 103 are indicated more faintly than the element 104, which is due to these three elements having been mechanically manipulated or optically blanked off in such a way that the light from the light source 100 will generate either a spectrum that is out of focus or a virtually non-visible spectrum. This means that in reality each spectrum is investigated successively not by tilting all the elements about, for example, the y-axis, but instead by bringing the elements 101-104 into such a position that each of them successively produces a spectrum which is in focus, whilst the others are out of focus, whereby such a spectrum that is in focus becomes clearly visible to the detector 109, whilst other spectra remain as they are so that they do not have major impact on the detection carried out by the detector 109.

Figure 41:
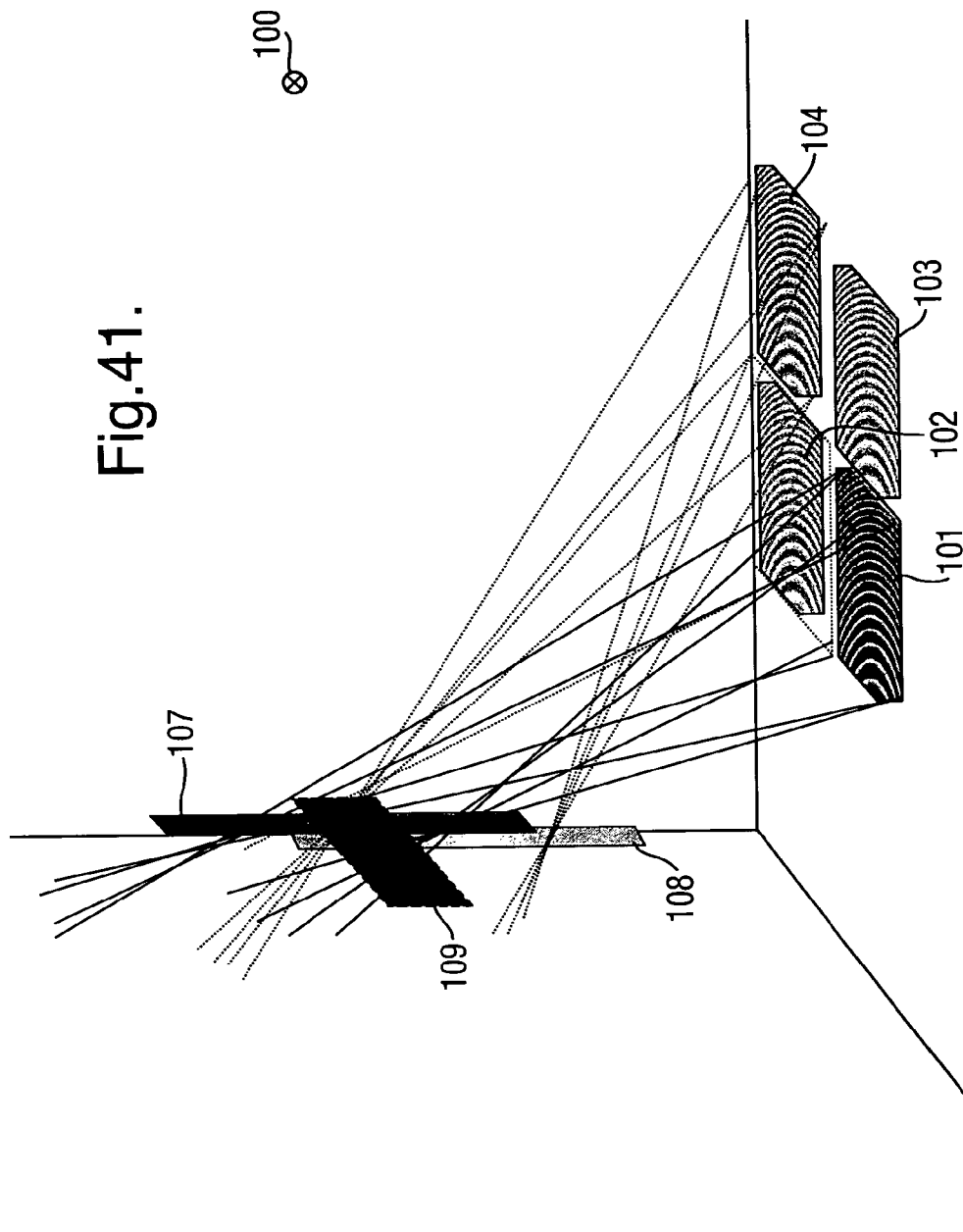
FIG. 41 shows a variant of FIG. 40.

FIG. 41 shows a light source 100 which transmits light towards a plurality of diffractive optical elements 101, 102, 103 and 104 in the form of Fresnel zone plates fragments. A spectrum is produced from each element, but for the sake of simplicity and clarity only two spectra 107 and 108 are shown from the elements 101 and 104 respectively. It will be seen that the spectrum 108 lies behind the spectrum 107 and is also indicated more faintly, which indicates that the spectrum is out of focus in relation to the dark field 109 which represents a light detector. It will also be seen that the elements 102, 103 and 104 are indicated more faintly than the element 101, which is due to these three elements having been mechanically manipulated or optically blanked off in such a way that the light from the light source 100 will generate either a spectrum that is out of focus or a virtually non-visible spectrum. This means that in reality each spectrum is investigated successively not by tilting all the elements about, for example, the y-axis, but instead by bringing the elements 101-104 into such a position that each of these successively produces a spectrum which is in focus, whilst the others are out of focus, whereby such a spectrum that is in focus becomes clearly visible to the detector 109, whilst other spectra remain as they are so that they do not have a major impact on the detection carried out by the detector 109.

Figure 42:
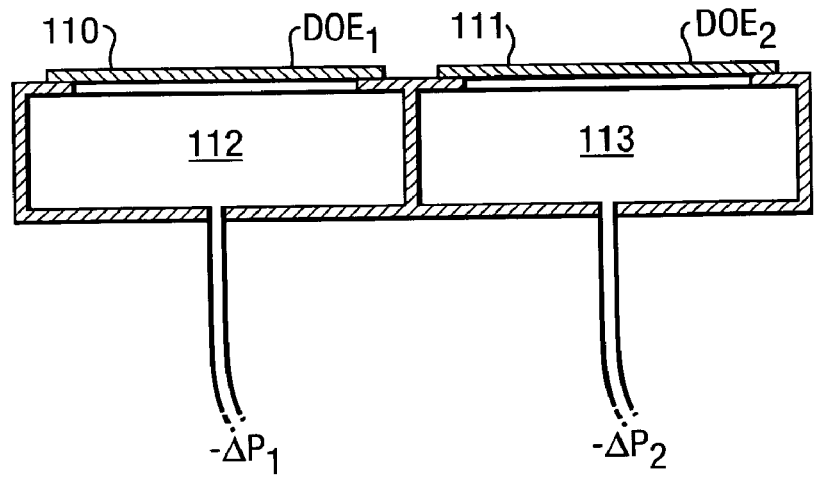
FIGS. 42 and 43 show schematically how the Fresnel zone plate fragments can be manipulated mechanically or optically blanked off.

FIG. 42 shows diffractive optical elements 110, 111 (respectively DOE1 and DOE2) each lying sealed against a respective pressure chamber 112, 113 where, for instance, respective negative pressure $-\Delta P1$ and $-\Delta P2$ can be supplied at time intervals, so that a spectrum generated by, for example, the element 110 is brought out of focus when a negative pressure is applied to the chamber 112, whilst the pressure chamber 113 has nominal pressure, so that a spectrum produced by the element 111 will then lie in focus for the detector 109 for the part of the spectrum that is to be investigated.

Figure 43:
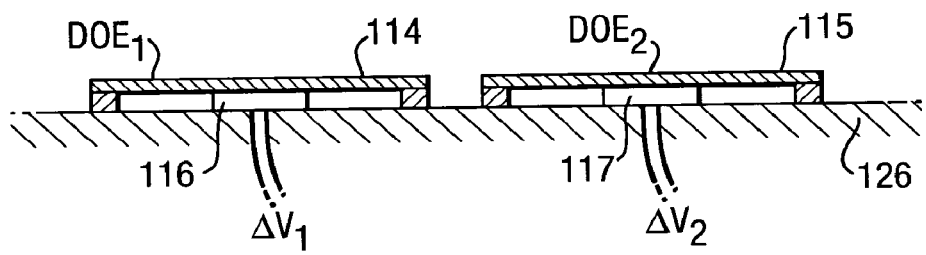

A similar reasoning applies to the embodiment in FIG. 43 where the diffractive optical elements (DOE1 and DOE2 respectively) are indicated by the reference numerals 114 and 115. In this case, instead of pressure chambers, electrically actuatable means 116 and 117 are used, which on the supply of drive voltage $\Delta V1$ and $\Delta V2$ at different times cause, for example, the downward bending of the respective element. The means 116 and 117 can, for example, consist of piezoelectric elements or electrostatic elements, whereby the bending up or down of the optical elements will take place depending upon drive voltage supplied. When the electrostatic principle is applied, one part of such a means will be fastened to the optical element, whilst a second part will be fastened to a base 126.

When a piezoelectric element is used, it will lie between the optical element 114, 115 and the base 126. If the optical element, for example, is supported at only one edge and at another can be held by said means, the optical element can in fact be tilted relative to the x or y-axis, which means that it is possible to shift the spectrum produced either sideways or in the longitudinal direction of the spectrum. This may be effective either for testing different colour combinations in spectrum that partly overlap in the longitudinal direction or to bring a spectrum outside a detection field.

Figure 44:
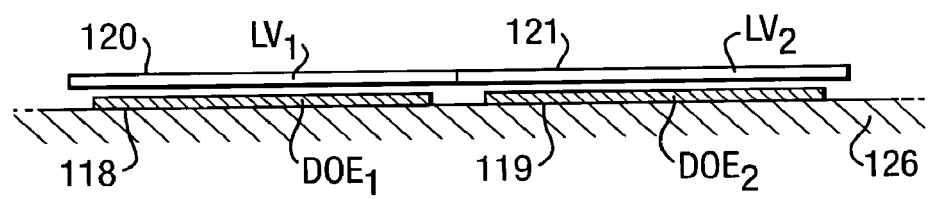
FIG. 44 shows schematically how the Fresnel zone plate fragments can be optically blanked off.

FIG. 44 shows diffractive optical elements (DOE1 and DOE2 respectively) designated by the reference numerals 118 and 119. In this case, the elements are covered by light valves LV1 and LV2, designated by the reference numerals 120 and 121. The light valves are activated (addressed) at different times, so that only one of the elements at a time is capable of generating a spectrum when illuminated from a light source.

In those cases where it may be favourable to consider both an IR spectrum and colours simultaneously, it will be expedient to use several detectors. An example of this is given in FIGS. 12 and 14 where at least one further detector 16", respectively 29" is added, which lies outside the detection field 17, respectively 30. It is also possible to envisage the detectors lying in different y positions owing to different focusing differences of an IR related spectrum and a typical colour spectrum.

The solution shown in FIG. 41 where the different, generatable spectra would have been almost superimposed if all the elements 101-104 had given similarly focused spectra simultaneously, permits in reality that many possible colour combinations of, for example, a medium such as an article, can be examined by combining two or more spectra, i.e., at least two elements produce their respective spectra which are superimposed on one another, but which are offset relative to each other.

Figure 45:
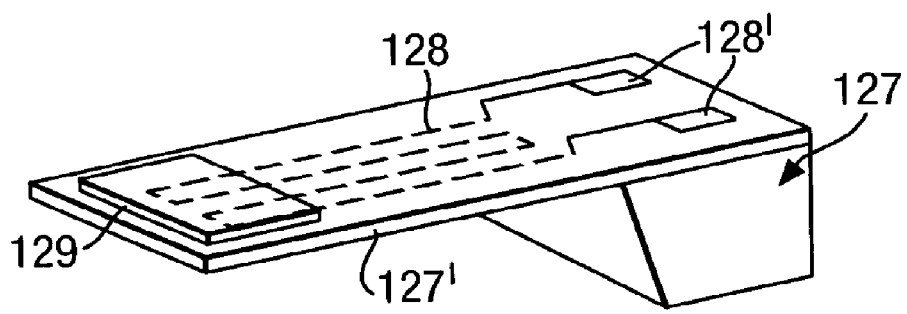
FIG. 45 shows as a second example a means for tilting a diffractive optical element.

FIG. 45 shows by way of example a means 127 for moving a DOE 129, where the device 127 has a beam structure 127' or similar, for example, a silicon beam, which is adapted to bend in response to power supply via terminals 128' to a power circuit 128 which causes the beam to bend as a consequence of heat generation. The power circuit 128 may optionally be replaced by piezoelectric or electromagnetic elements.

Figure 46:
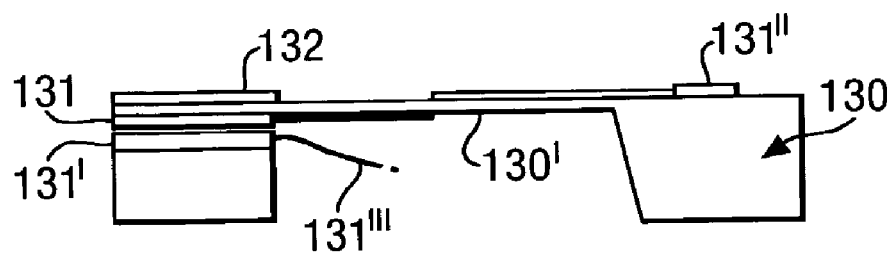
FIG. 46 shows a variant of the means in FIG. 45.

FIG. 46 shows by way of example a means 130 for moving a DOE 132 by using a capacitive element 131, 131' which receives voltage supply via terminals 131", 131''', so that there is capacitive attraction or repulsion, and thus movement of the beam 130', for example, a silicon beam.

Figure 47:
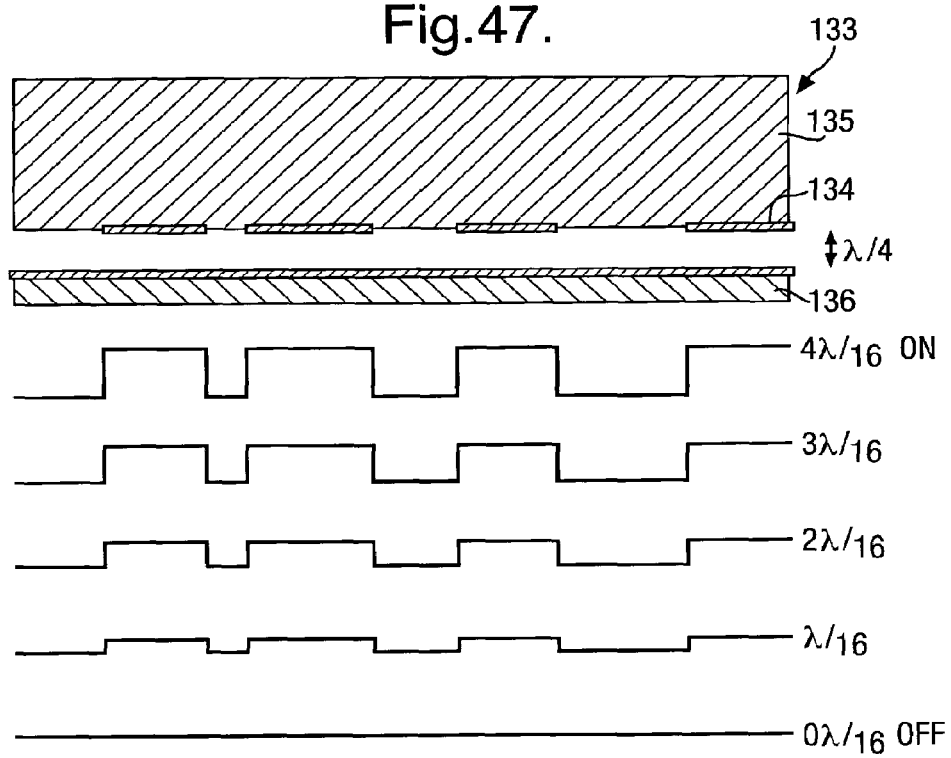
FIG. 47 shows an alternative method for disabling a diffractive optical element.

Several alternative solutions are shown in the description and the drawings for activating or deactivating certain diffractive optical elements (fragments or parts) by mechanical manipulation of the element. FIG. 47 shows an alternative solution where the aim, in particular within the concept according to the present invention, is to be able to switch on and off various parts of a binary hologram by changing the spacing between upper, first and lower, second reflective surfaces. The principle is known per se from optical modulators, cf., for example, U.S. Pat. No. 5,311,360, where the spacing between an upper plane of reflective beams and a lower reflective plane is changed to deactivate and activate the diffraction effect of a diffractive optical element.

It is conceivable that an upper, reflective part 133 of a binary diffractive optical element can be made in the form of a metallised pattern 134 on a glass plate 135, and where the lower part of the binary formed diffractive optical element is only a reflective surface. The term "binary" is understood to mean an element where the relief height may only have two levels. The lower reflective surface may, for example, be a thin, metallised membrane 136, and the membrane may be mounted with $\lambda/4$ spacers. By, for example, applying an electric field, it will be possible to pull the membrane towards the metallised pattern 134, thereby changing the spacing from $n\lambda/2+\lambda/4 \Rightarrow$ ON to $n\lambda/2 \Rightarrow$ OFF, where n=0, 1, 2, 3 . . . .

In this way the diffractive optical element (optionally with its fragments or parts) will be deformable so that, for example, at $0\lambda/16$ the element has in reality only a reflecting surface. The diffraction efficiency will thus be affected by, for example, the introduction of an electric field between the membrane 136 and the plate 135, and, for example, a stepwise adjustment of the field can be provided and thus a corresponding change of the diffraction efficiency. The diffraction efficiency of the element will be greatest at $n\lambda/2+\lambda/4$, and smallest at $n\lambda/2$, n=0, 1, 2, 3 . . . . The diffraction efficiency of the element in a period equal to $\lambda/2$, from $m\lambda/2$ to $(m+1)\lambda 2$, where m=0, 1, 2, 3, 4 . . . follows an approximate Gaussian curve, where the maximum is half way. Advantageously, the nominal spacing can be variable in steps between $0\lambda$ and $4\lambda/16$, each step being, e.g., $\lambda 16$.

Figure 48:
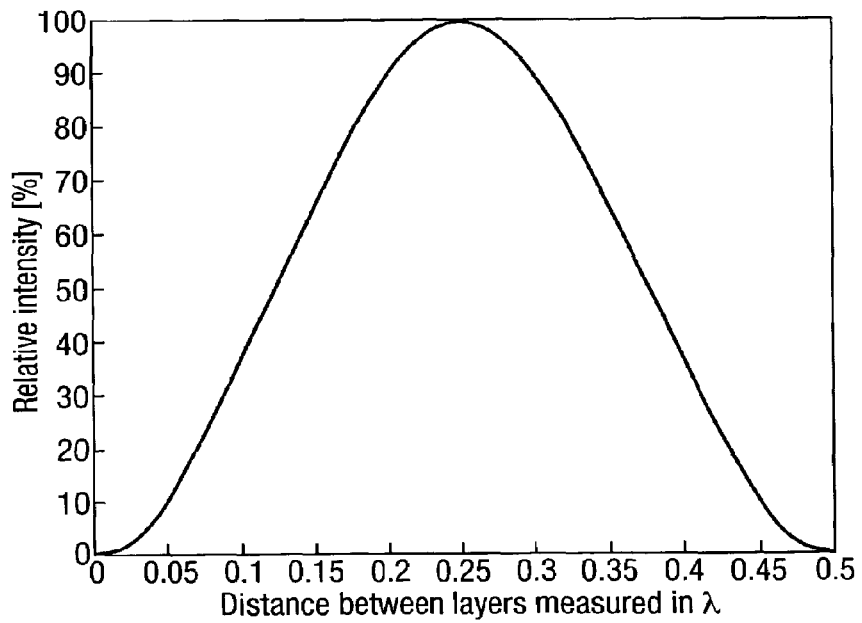
FIG. 48 shows a distance/intensity diagram related to this alternative method.

It is clear from FIG. 48 that the diffraction efficiency will be cyclic with periodicity of about 0.5 $\lambda$.

The invention claimed is:

1. A diffractive optical element device for use in spectroscopy, which comprises a light source for emitting broad-band light, a diffractive optical element towards which the light is emitted, and at least one detector for receiving the light transmitted by the diffractive optical element, wherein the diffractive optical element has a plurality of diffractive, dispersively focusing patterns which form one pattern plane, each pattern having an optical axis, wherein the respective centre of each of said patterns being at a location where the optical axis extends through the plane of each pattern, wherein the respective optical axes are two-dimensionally offset relative to each other in order to produce a plurality of spectra wherein each of said spectra are focused on the at least one detector, and wherein at least two spectra thereof are separate and offset relative to each other.

2. A diffractive optical element device as disclosed in claim 1, characterised in that said plurality of patterns are partly integrated into each other.

3. A diffractive optical element device as disclosed in claim 1, characterised in
that the diffractive optical element is tiltable about at least a first axis, so that when the diffractive optical element is tilted, said at least one detector is caused to detect a first set of different spectral regions in respective ones of said separate spectra.

4. A diffractive optical element device as disclosed in claim 3, characterised in
that the diffractive optical element is tiltable about a second axis that is orthogonal to the first axis, so that when the diffractive optical element is tilted, said at least one detector is caused to detect at least a second set of different spectral regions in respective ones of said separate spectra.

5. A diffractive optical element device as disclosed in claim 2, characterised in
that the diffractive optical element is tiltable about at least a first axis, so that when the diffractive optical element is tilted, said at least one detector is caused to detect a first set of different spectral regions in respective ones of said separate spectra.

6. A diffractive optical element device as disclosed in claim 5, characterised in
that the diffractive optical element is tiltable about a second axis that is orthogonal to the first axis, so that when the diffractive optical element is tilted, said at least one detector is caused to detect at least a second set of different spectral regions in respective ones of said separate spectra.

7. A diffractive optical element device as disclosed in claim 1, characterised in
that the spectral bands of said spectra extend in one direction in a plane of the spectra, and
that at least one detector is movable in a direction transverse to said one direction of the spectral bands.

8. A diffractive optical element device as disclosed in claim 7, characterised in
that the position of said at least one detector is adjustable along said one direction of the spectral bands.

9. A diffractive optical element device as disclosed in claim 2, characterised in
that the spectral bands of said spectra extend in one direction in a plane of the spectra, and
that at least one detector is movable in a direction transverse to said one direction of the spectral bands.

10. A diffractive optical element device as disclosed in claim 9, characterised in
that the position of said at least one detector is adjustable along said one direction of the spectral bands.

11. A diffractive optical element device as disclosed in claim 1, characterised in
that the spectral bands of said spectra extend in one direction in a plane of the spectra, and
that the position of the light source is adjustable along said one direction of said spectral bands.

12. A diffractive optical element device as disclosed in claim 11, characterised in
that the light source emits light through a fixed aperture; and
that a rotating disc is arranged in front of the aperture, the disc being equipped with at least one slit or a plurality of minute holes, so that light passes through the slit or said holes whilst the slit or the holes, because of their arc-shaped arrangement on the disc, move across the length of the aperture as the disc rotates.

13. A diffractive optical element device as disclosed in claim 11, characterised in
that the light source emits light via an optical fibre that is mechanically movable by exciting a piezoelectric element to which the end portion of the light fibre is attached.

14. A diffractive optical element device as disclosed in claim 2, characterised in
that the spectral bands of said spectra extend in one direction in a plane of the spectra, and
that the position of the light source is adjustable along said one direction of said spectral bands.

15. A diffractive optical element device as disclosed in claim 14, characterised in
that the light source emits light through a fixed aperture; and
that a rotating disc is arranged in front of the aperture, the disc being equipped with at least one slit or a plurality of minute holes, so that light passes through the slit or said holes whilst the slit or the holes, because of their arc-shaped arrangement on the disc, move across the length of the aperture as the disc rotates.

16. A diffractive optical element device as disclosed in claim 14, characterised in
that the light source emits light via an optical fibre that is mechanically movable by exciting a piezoelectric element to which the end portion of the light fibre is attached.

17. A diffractive optical element device as disclosed in claim 1, characterised in
that the spectral bands of said spectra extend in one direction in a plane of the spectra, and
that at least two detectors are arranged in the direction of the spectral bands of said spectra.

18. A diffractive optical element device as disclosed in claim 17, characterised in
that the output from said at least two detectors is collectable by time-multiplexing.

19. A diffractive optical element device as disclosed in claim 2, characterised in
that the spectral bands of said spectra extend in one direction in a plane of the spectra, and
that at least two detectors are arranged in the direction of the spectral bands of said spectra.

20. A diffractive optical element device as disclosed in claim 19, characterised in
that the output from said at least two detectors is collectable by time-multiplexing.

21. A diffractive optical element device as disclosed in claim 1, characterised in
that the diffractive optical element has a plurality of diffractive dispersively focusing patterns which form fragments of the element, and whose respective centres are two-dimensionally offset relative to each other in order to produce a plurality of spectra where at least two are separate, but offset relative to each other; and
that at least one of the fragments is attached to means so as to cause the fragment to be selectively mechanically manipulatable in order to deform such a fragment, so that a spectrum generated therefrom lies in focus of a second detector.

22. A diffractive optical element device as disclosed in claim 1, characterised in
that the diffractive optical element has a plurality of diffractive dispersively focusing patterns which form fragments of the element, and whose respective centres are two-dimensionally offset relative to each other in order to produce a plurality of spectra where at least two are separate, but offset relative to each other and that at least one of the fragments is associated with means for causing the fragment to be selectively manipulatable through light controllably blocking light reflection from the fragment.

23. A diffractive optical element device as disclosed in claim 21, characterised in that the position of the light source is adjustable.

24. A diffractive optical element device as disclosed in claim 23, characterised in that the light source emits light through a fixed aperture; and that a rotating disc is arranged in front of the aperture, the disc being equipped with at least one slit or a plurality of minute holes, so that light passes through the slit or said holes whilst the slit or the holes, because of their arc-shaped arrangement on the disc, travel across the length of the aperture as the disc rotates.

25. A diffractive optical element device as disclosed in claim 21, characterised in that the light source emits light via an optical fibre that is mechanically movable by exciting a piezoelectric element to which the end portion of the light fibre is attached.

26. A diffractive optical element device as disclosed in claim 22, characterised in that the position of the light source is adjustable.

27. A diffractive optical element device as disclosed in claim 26, characterised in that the light source emits light through a fixed aperture; and that a rotating disc is arranged in front of the aperture, the disc being equipped with at least one slit or a plurality of minute holes, so that light passes through the slit or said holes whilst the slit or the holes, because of their arc-shaped arrangement on the disc, travel across the length of the aperture as the disc rotates.

28. A diffractive optical element device as disclosed in claim 22, characterised in that the light source emits light via an optical fibre that is mechanically movable by exciting a piezoelectric element to which the end portion of the light fibre is attached.

29. A diffractive optical element device as disclosed in claim 1, characterised in that spectral bands of said spectra extend in one direction in a single plane, and that at least two detectors are arranged in said one direction of the spectral bands.

30. A diffractive optical element device as disclosed in claim 2, characterised in that spectral bands of said spectra extend in one direction in a single plane, and that at least two detectors are arranged in said one direction of the spectral bands.

31. A diffractive optical element device as disclosed in claim 21, characterised in that spectral bands of said spectra extend in one direction in a single plane, and that at least two detectors are arranged in said one direction of the spectral bands.

32. A diffractive optical element device as disclosed in claim 22, characterised in that spectral bands of said spectra extend in one direction in a single plane, and that at least two detectors are arranged in said one direction of the spectral bands.

33. A diffractive optical element device as disclosed in claim 1, characterised in that spectral bands of said spectra extend in one direction in a single plane, and that at least two detectors are arranged in a direction transverse to said one direction of the spectral bands.

34. A diffractive optical element device as disclosed in claim 2, characterised in that spectral bands of said spectra extend in one direction in a single plane, and that at least two detectors are arranged in a direction transverse to said one direction of the spectral bands.

35. A diffractive optical element device as disclosed in claim 21, characterised in that spectral bands of said spectra extend in one direction in a single plane, and that at least two detectors are arranged in a direction transverse to said one direction of the spectral bands.

36. A diffractive optical element device as disclosed in claim 22, characterised in that spectral bands of said spectra extend in one direction in a single plane, and that at least two detectors are arranged in a direction transverse to said one direction of the spectral bands.

37. A diffractive optical element device as disclosed in claim 1, characterised in that spectral bands of said spectra extend in one direction, and that at least two detectors are arranged in a direction orthogonal to a spectral band plane.

38. A diffractive optical element device as disclosed in claim 2, characterised in that spectral bands of said spectra extend in one direction, and that at least two detectors are arranged in a direction orthogonal to a spectral band plane.

39. A diffractive optical element device as disclosed in claim 21, characterised in that spectral bands of said spectra extend in one direction, and that at least two detectors are arranged in a direction orthogonal to a spectral band plane.

40. A diffractive optical element device as disclosed in claim 22, characterised in that spectral bands of said spectra extend in one direction, and that at least two detectors are arranged in a direction orthogonal to a spectral band plane.

41. A diffractive optical element device as disclosed in claim 1, characterised in that a light deflecting element comprising a tiltable mirror, is disposed in the light path between the light source and the diffractive optical element.

42. A diffractive optical element device as disclosed in claim 2, characterised in that a light deflecting element comprising a tiltable mirror, is disposed in the light path between the light source and the diffractive optical element.

43. A diffractive optical element device as disclosed in claim 21, characterised in that a light deflecting element comprising a tiltable mirror, is disposed in a light path between the light source and the diffractive optical element.

44. A diffractive optical element device as disclosed in claim 22, characterised in
that a light deflecting element comprising a tiltable mirror, is disposed in a light path between the light source and the diffractive optical element.

45. A diffractive optical element device as disclosed in claim 1, characterised in
that a light deflecting element comprising a tiltable mirror, is disposed in the light path between the diffractive optical element and the detector.

46. A diffractive optical element device as disclosed in claim 2, characterised in
that a light deflecting element comprising a tiltable mirror, is disposed in the light path between the diffractive optical element and the detector.

47. A diffractive optical element device as disclosed in claim 21, characterised in
that a light deflecting element comprising a tiltable mirror, is disposed in a light path between the diffractive optical element and the detector.

48. A diffractive optical element device as disclosed in claim 22, characterised in
that a light deflecting element comprising a tiltable mirror, is disposed in a light path between the diffractive optical element and the detector.

49. A diffractive optical element device as disclosed in claim 1, characterised in
that the diffractive optical element is designed to change its diffraction efficiency when manipulated, and
that the diffractive optical element has a binary level surface.

50. A diffractive optical element device as disclosed in claim 2, characterised in
that the diffractive optical element is designed to change its diffraction efficiency when manipulated, and
that the diffractive optical element has a binary level surface.

51. A diffractive optical element device as disclosed in claim 21, characterised in
that the diffractive optical element is designed to change its diffraction efficiency when manipulated, and
that the diffractive optical element has a binary level surface.

52. A diffractive optical element device as disclosed in claim 22, characterised in
that the diffractive optical element is designed to change its diffraction efficiency when manipulated, and
that the diffractive optical element has a binary level surface.

53. A diffractive optical element device as disclosed in claim 1, characterised in
that the diffractive optical element consists of a base portion having a first pattern and a movable portion having a reflective or differently patterned face;
that the base portion and the movable portion have nominal spacing;
that the diffractive optical element is arranged to change the nominal spacing when manipulated, thereby altering the diffraction efficiency of the diffractive optical element.

54. A diffractive optical element device as disclosed in claim 2, characterised in
that the diffractive optical element consists of a base portion having a first pattern and a movable portion having a reflective or differently patterned face;
that the base portion and the movable portion have nominal spacing;
that the diffractive optical element is arranged to change the nominal spacing when manipulated, thereby altering the diffraction efficiency of the diffractive optical element.

55. A diffractive optical element device as disclosed in claim 21, characterised in
that the diffractive optical element consists of a base portion having a first pattern and a movable portion having a reflective or differently patterned face;
that the base portion and the movable portion have nominal spacing;
that the diffractive optical element is arranged to change the nominal spacing when manipulated, thereby altering the diffraction efficiency of the diffractive optical element.

56. A diffractive optical element device as disclosed in claim 22, characterised in
that the diffractive optical element consists of a base portion having a first pattern and a movable portion having a reflective or differently patterned face;
that the base portion and the movable portion have nominal spacing;
that the diffractive optical element is arranged to change the nominal spacing when manipulated, thereby altering the diffraction efficiency of the diffractive optical element.

57. A diffractive optical element device as disclosed in claim 53, characterised in
that the nominal spacing is $n\lambda/2+\lambda/4$, where $n=1, 2, 3 \ldots$, and where $\lambda$ is the wavelength of the light.

58. A diffractive optical element device as disclosed in claim 54, characterised in
that the nominal spacing is $n\lambda/2+\lambda/4$, where $n=1, 2, 3 \ldots$, and where $\lambda$ is the wavelength of the light.

59. A diffractive optical element device as disclosed in claim 55, characterised in
that the nominal spacing is $n\lambda/2+\lambda/4$, where $n=1, 2, 3 \ldots$, and where $\lambda$ is the wavelength of the light.

60. A diffractive optical element device as disclosed in claim 56, characterised in
that the nominal spacing is $n\lambda/2+\lambda/4$, where $n=1, 2, 3 \ldots$, and where $\lambda$ is the wavelength of the light.

61. A diffractive optical element device as disclosed in claim 53, characterised in
that the diffraction efficiency of the element is greatest at $n\lambda/2+\lambda/4$ and smallest at $n\lambda/2$, where $n=1, 2, 3 \ldots$, and where $\lambda$ is the wavelength of the light.

62. A diffractive optical element device as disclosed in claim 54, characterised in
that the diffraction efficiency of the element is greatest at $n\lambda/2+\lambda/4$ and smallest at $n\lambda/2$, where $n=1, 2, 3 \ldots$, and where $\lambda$ is the wavelength of the light which is related to the function of the diffractive optical element.

63. A diffractive optical element device as disclosed in claim 55, characterised in
that the diffraction efficiency of the element is greatest at $n\lambda/2+\lambda/4$ and smallest at $n\lambda/2$, where $n=1, 2, 3 \ldots$, and where $\lambda$ is the wavelength of the light which is related to the function of the diffractive optical element.

64. A diffractive optical element device as disclosed in claim 56, characterised in
that the diffraction efficiency of the element is greatest at $n\lambda/2+\lambda/4$ and smallest at $n\lambda/2$, where $n=1, 2, 3 \ldots$, and where $\lambda$ is the wavelength of the light which is related to the function of the diffractive optical element.

65. A diffractive optical element device as disclosed in claim 1, wherein at least two of the spectra are partly overlapping.

66. A diffractive optical element device as disclosed in claim 2, wherein at least two of the spectra are partly overlapping.

67. A diffractive optical element device as disclosed in claim 1, characterised in that the diffractive optical element consists of at least two diffractive optical element parts which are related to respective wavelengths and which produce at least two separate spectra or at least two mutually partly overlapping spectra to give a composite spectrum, where at least one of the diffractive optical element parts is attached to a means for causing the diffractive optical element part to be selectively manipulatable mechanically in order to deform such diffractive optical element part, so that a spectrum generated therefrom lies in focus of a second detector.

68. A diffractive optical element device as disclosed in claim 1, characterised in that the diffractive optical element consists of at least two diffractive optical element parts which are related to respective wavelengths and which produce at least two separate spectra or at least two mutually partly overlapping spectra to give a composite spectrum, where at least one of the diffractive optical element parts is attached to means for causing the diffractive optical element part to be selectively manipulatable through light controllably blocking light reflection from the element part.

69. A diffractive optical element device according to claim 1, further comprising means for moving the position of a detection field of the at least one detector relative to the spectra.

70. A diffractive optical element device according to claim 1, wherein the device is configured to produce each of the plurality of spectra parallel to an axis perpendicular to the pattern plane.

71. A diffractive optical element device for use in spectroscopy, which comprises a light source for emitting broad-band light, a diffractive optical element towards which the light is emitted, and at least one detector for receiving the light transmitted by the diffractive optical element, characterised in that the diffractive optical element has a plurality of diffractive, dispersively focusing patterns which form one pattern plane, each pattern having an optical axis, wherein the respective centre of each of said patterns being at a location where the optical axis extends through the plane of each pattern, wherein the respective optical axes are two-dimensionally offset relative to each other in order to produce a plurality of spectra where at least two spectra are separate and offset relative to each other;

and wherein the plurality of diffractive dispersively focusing patterns form fragments of the element; and that at least one of the fragments is attached to means so as to cause the fragment to be selectively mechanically manipulatable in order to deform such a fragment, so that a spectrum generated therefrom lies in focus of a second detector.

72. A diffractive optical element device for use in spectroscopy, which comprises a light source for emitting broad-band light, a diffractive optical element towards which the light is emitted, and at least one detector for receiving the light transmitted by the diffractive optical element, characterised in that the diffractive optical element has a plurality of diffractive, dispersively focusing patterns which form one pattern plane, each pattern having an optical axis, wherein the respective centre of each of said patterns being at a location where the optical axis extends through the plane of each pattern, and wherein the respective optical axes are two-dimensionally offset relative to each other in order to produce a plurality of spectra where at least two spectra are separate spectra offset relative to each other;

and wherein the diffractive optical element consists of at least two diffractive optical element parts which are related to respective wavelengths and which produce at least two separate spectra or at least two mutually partly overlapping spectra to give a composite spectrum, where at least one of the diffractive optical element parts is attached to a means for causing the diffractive optical element part to be selectively manipulatable mechanically in order to deform such diffractive optical element part, so that a spectrum generated therefrom lies in focus of a second detector.

* * * * *